United States Patent
Kim et al.

(10) Patent No.: US 11,166,285 B2
(45) Date of Patent: Nov. 2, 2021

(54) DOWNLINK CONTROL CHANNEL CONFIGURATION METHOD AND APPARATUS IN WIRELESS COMMUNICATION SYSTEM FOR REDUCING POWER CONSUMPTION OF TERMINAL

(71) Applicant: Samsung Electronics Co., Ltd., Gyeonggi-do (KR)

(72) Inventors: Taehyoung Kim, Seoul (KR); Jinyoung Oh, Seoul (KR); Seunghoon Choi, Gyeonggi-do (KR); Heedon Gha, Gyeonggi-do (KR); Youngbum Kim, Seoul (KR); Taehan Bae, Seoul (KR)

(73) Assignee: Samsung Electronics Co., Ltd

( * ) Notice: Subject to any disclaimer, the term of this patent is extended or adjusted under 35 U.S.C. 154(b) by 51 days.

(21) Appl. No.: 16/639,890

(22) PCT Filed: Aug. 20, 2018

(86) PCT No.: PCT/KR2018/009540
§ 371 (c)(1),
(2) Date: Feb. 18, 2020

(87) PCT Pub. No.: WO2019/035701
PCT Pub. Date: Feb. 21, 2019

(65) Prior Publication Data
US 2020/0367253 A1   Nov. 19, 2020

(30) Foreign Application Priority Data

Aug. 18, 2017 (KR) .................. 10-2017-0104751
Aug. 22, 2017 (KR) .................. 10-2017-0106286

(51) Int. Cl.
*H04W 72/04* (2009.01)
*H04W 24/08* (2009.01)
(Continued)

(52) U.S. Cl.
CPC ....... *H04W 72/0493* (2013.01); *H04W 24/08* (2013.01); *H04W 72/042* (2013.01); *H04W 80/02* (2013.01); *H04W 80/08* (2013.01)

(58) Field of Classification Search
CPC ............. H04W 76/27; H04W 72/0493; H04W 72/042; H04W 72/1294; H04W 24/08; H04W 80/02; H04W 80/08
See application file for complete search history.

(56) References Cited

U.S. PATENT DOCUMENTS

2013/0294318 A1* 11/2013 Amerga ................. H04W 4/06
370/312
2016/0295560 A1   10/2016 Chen et al.

FOREIGN PATENT DOCUMENTS

KR  1020190019791           2/2019
WO  WO 2016/163656         10/2016

OTHER PUBLICATIONS

PCT/ISA/210 Search Report issued on PCT/KR2018/009540, pp. 5.
(Continued)

*Primary Examiner* — Wei Zhao
(74) *Attorney, Agent, or Firm* — The Farrell Law Firm, P.C.

(57) ABSTRACT

The present disclosure relates to a communication technique for combining a 5G communication system for supporting higher data transmission rates after 4G systems with IoT technology, and a system therefor. The present disclosure can be applied for intelligent services based on 5G communication technology and IoT related technology (for example, smart homes, smart buildings, smart cities, smart cars or connected cars, healthcare, digital education, retail businesses, security and safety related services, and the like). The present invention provides a method and an apparatus for dynamically modifying a configuration of a physical (Continued)

downlink control channel, wherein a base station of a communication system of the present invention may determine whether to dynamically modify a physical downlink control channel (PDCCH) configuration, transmit to a terminal a configuration modification indicator indicating a configuration to be modified if dynamically modifying the PDCCH configuration, and apply the modified configuration and transmit downlink control information (DCI) onto the PDCCH.

15 Claims, 21 Drawing Sheets

(51) Int. Cl.
*H04W 80/02* (2009.01)
*H04W 80/08* (2009.01)

(56) References Cited

OTHER PUBLICATIONS

PCT/ISA/237 Written Opinion issued on PCT/KR2018/009540, pp. 6.

Apple Inc., "Control Information for UE Power Saving", 3GPP TSG-RAN WG1 90, R1-1714092, Prague, Czech, Aug. 12, 2017, pp. 8.

Huawei, HiSilicon, "On power-saving signal for eFeMTC", 3GPP TSG RAN WG1 Meeting #90, R1-1712106, Prague, Czech Republic, Aug. 12, 2017, pp. 10.

Samsung, "Power saving for for paging and connected-mode DRX for NB-IoT", 3GPP TSG RAN WG1 Meeting #90, R1-1713544, Prague, Czechia, Aug. 11, 2017, pp. 7.

Ericsson, "Power consumption reduction for paging and connected-mode DRX for NB-IoT", 3GPP TSG RAN WG1 Meeting #90, R1-1712621, Prague, Czech Republic, Aug. 12, 2017, pp. 11.

* cited by examiner

DOWNLINK CONTROL CHANNEL CONFIGURATION METHOD AND APPARATUS IN WIRELESS COMMUNICATION SYSTEM FOR REDUCING POWER CONSUMPTION OF TERMINAL

PRIORITY

This application is a National Phase Entry of PCT International Application No. PCT/KR2018/009540 which was filed on Aug. 20, 2018, and claims priority to Korean Patent Application Nos. 10-2017-0104751 and 10-2017-0106286, which were filed on Aug. 18, 2017 and Aug. 22, 2017, respectively, the content of each of which is incorporated herein by reference.

TECHNICAL FIELD

The disclosure relates to a wireless communication system and, more particularly, to a method and apparatus for establishing a downlink control channel for reducing power consumption of a terminal.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, 5G communication technologies such as sensor network, machine to machine (M2M), machine type communication (MTC), and the like are implemented by techniques such as beamforming, MIMO, array antennas, and the like. The application of a cloud RAN as the big data processing technology may be an example of convergence of the 5G technology and the IoT technology.

In a 5G communication system, information on a downlink control channel is transmitted through higher layer signaling, whereby a terminal may monitor the downlink control channel.

DETAILED DESCRIPTION OF INVENTION

Technical Problem

The disclosure proposes a method of dynamically changing control channel configuration information in order to more effectively reduce power consumption of a terminal according to downlink control channel monitoring.

Solution to Problem

In accordance with an aspect of the disclosure, a method of monitoring a control channel by a UE of a wireless communication system includes: receiving physical downlink control channel (PDCCH) configuration information indicating a first configuration from an eNB; monitoring a PDCCH according to the first configuration on the basis of the PDCCH configuration information; receiving a configuration switching indicator indicating a second configuration from the eNB; and monitoring the PDCCH according to the second configuration on the basis of the configuration switching indicator, wherein the configuration switching indicator includes at least one of a control channel monitoring period, search space configuration information, and bandwidth configuration information to monitor the PDCCH, and the configuration switching indicator is transmitted using one of a medium access control (MAC) control element (CE) or downlink control information.

In accordance with another aspect of the disclosure, a method of transmitting control information by an eNB in a wireless communication system includes: transmitting PDCCH configuration information indicating a first configuration to a UE; transmitting downlink control information to the UE on the basis of the first configuration; receiving a configuration switching indicator indicating a second configuration to the UE; and transmitting the downlink control information to the UE according to the second configuration, wherein the configuration switching indicator includes at least one of a control channel monitoring period, search space configuration information, and bandwidth configuration information to which the downlink control information is transmitted, and the configuration switching indicator is transmitted using one of a MAC CE or downlink control information.

In accordance with another aspect of the disclosure, a UE that monitors a control channel of a wireless communication system includes: a transceiver; and a controller configured to be connected to the transceiver and configured to control the transceiver to receive PDCCH configuration information indicating a first configuration from an eNB, to monitor a PDCCH according to the first configuration on the basis of the PDCCH configuration information, to receive a configuration switching indicator indicating a second configuration from the eNB, and to monitor the PDCCH according to the second configuration on the basis of the configuration switching indicator, wherein the configuration switching indicator includes at least one of a control channel monitoring period, search space configuration information, and bandwidth configuration information to monitor the PDCCH, and the configuration switching indicator is transmitted using one of a MAC CE or downlink control information.

In accordance with another aspect of the disclosure, an eNB that transmits control information of a wireless communication system includes: a transceiver; and a controller configured to be connected to the transceiver and configured to control the transceiver to transmit PDCCH configuration information indicating a first configuration to a UE, to transmit downlink control information to the UE on the basis of the first configuration, to receive a configuration switching indicator indicating a second configuration from the UE, and to transmit the downlink control information to the UE according to the second configuration, wherein the configuration switching indicator includes at least one of a control channel monitoring period, search space configuration information, and bandwidth configuration information to which the downlink control information is transmitted, and the configuration switching indicator is transmitted using one of a MAC CE or downlink control information.

Advantageous Effects of Invention

According to the disclosure, it is possible to effectively reduce the power consumption of a terminal according to the monitoring of a downlink control channel by dynamically changing configuration information on the downlink control channel in a 5G communication system.

MODE FOR CARRYING OUT THE INVENTION

Figure 1:
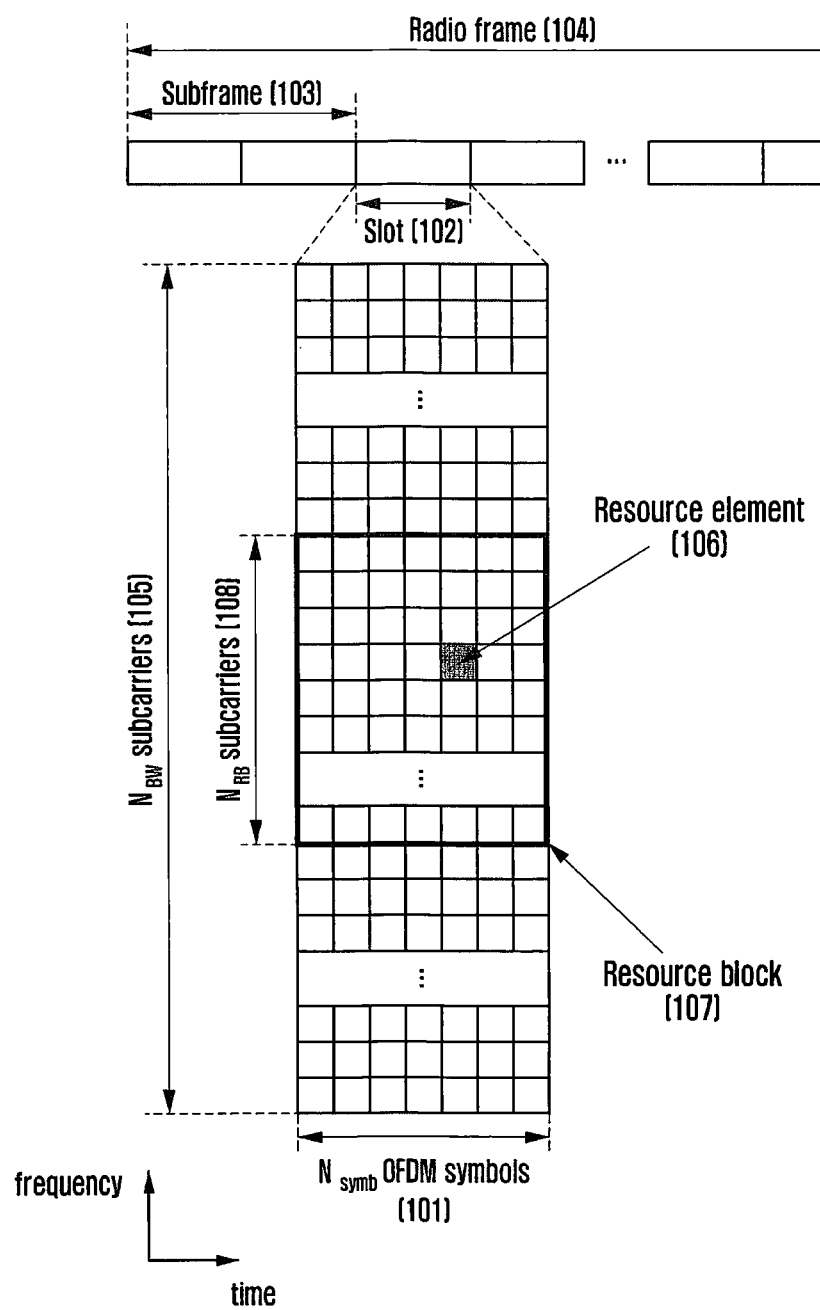
FIG. 1 is a diagram illustrating a basic structure of a time-frequency domain in LTE.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flow-chart illustrations, and combinations of blocks in the flow-chart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~ unit' may include one or more processors.

Wireless communication systems have evolved from early systems providing voice-oriented services to broadband wireless communication systems providing high-speed and high-quality packet data services as in the communication standards such as high speed packet access (HSPA), long-term evolution (LTE) or evolved universal terrestrial radio access (E-UTRA), LTE-advanced (LTE-A), and LTE-pro of 3GPP, high rate packet data (HRPD) and ultra mobile broadband (UMB) of 3GPP2, and 802.16e of IEEE.

As a representative example of the broadband wireless communication systems, the LTE system employs orthogonal frequency division multiplexing (OFDM) for downlink (DL) transmission and employs single-carrier frequency division multiple access (SC-FDMA) for uplink (UL) transmission. A UL refers to a radio link through which a user equipment (UE, or also referred to as "terminal" or "mobile station (MS)") transmits data or control signals to an eNode B (eNB, also referred to as "gNB or "base station (BS)"), and a DL refers to a radio link through which an eNB transmits data or control signals to a UE. In such a multiple access scheme, time-frequency resources carrying data and control information of each user are generally allocated and used not to overlap to achieve orthogonality, thereby distinguishing between the data and the control information.

Since the 5G communication system, which is a future communication system after the LTE system, should be able to freely reflect various requirements from users and service providers, services that simultaneously satisfy the various requirements should be supported. Services considered for the 5G communication system include enhanced mobile broadband (eMBB), massive machine type communication (mMTC), ultra reliability low latency communication (URLLC), etc.

An eMBB aims to provide a higher data rate than data rates supported by existing LTE, LTE-A or LTE-Pro systems. For example, in a 5G communication system, an eMBB should be able to provide a peak data rate of 20 Gbps in downlink and a peak data rate of 10 Gbps in uplink in terms of one eNB. In addition, the 5G communication system should provide a peak data rate and an increased user perceived data rate of a UE. To meet these requirements, improvements in various transmission and reception techniques are required, including more advanced multi input multi output (MIMO) transmission techniques. In addition, the current LTE system transmits signals using a maximum transmission bandwidth of 20 MHz in a 2 GHz band, whereas the 5G communication system uses a wider frequency bandwidth of 20 MHz in a frequency band of 3 to 6 GHz or 6 GHz or more, and thereby it is possible to satisfy the data rate required for the 5G communication system.

At the same time, mMTC is considered to support application services such as Internet of Thing (IoT) in the 5G communication system. In order to efficiently provide the IoT, the mMTC requires a large-scale UE access support in a cell, coverage improvement of a UE, improved battery time, a UE cost reduction, and the like. Since the IoT is attached to various sensors and various devices to provide a communication function, it must be able to support a large number of UEs (e.g., 1,000,000 UEs/km$^2$) in a cell. In addition, since a UE supporting the mMTC is likely to be located in a shadow area that a cell does not cover, such as the basement of a building due to the characteristics of the service, the UE requires wider coverage compared to other services provided by the 5G communication system. The UE supporting the mMTC should be composed of a low-cost UE, and requires a very long battery life time such as 10 to 15 years because it is difficult to replace the battery of the UE frequently.

Finally, URLLC is a cellular-based wireless communication service used for a mission-critical purpose. For example, services used in remote control for robots or machinery, industrial automation, unmanned aerial vehicles, remote health care, emergency alerts, and the like may be considered. Therefore, the communication provided by URLLC should provide very low latency and very high reliability. For example, a service that supports URLLC must satisfy an air interface latency of less than 0.5 ms and at the same time requires a packet error rate of 10 to 5 or less. Therefore, for services that support URLLC, the 5G system must provide a smaller transmit time interval (TTI) than other services and at the same time, there is a need for a design that requires allocating large resources in the frequency band to ensure the reliability of a communication link.

Three services of the 5G communication system, eMBB, URLLC, and mMTC can be multiplexed and transmitted in one system. In this case, different transmission/reception techniques and transmission/reception parameters may be used between services to satisfy different requirements of the respective services. In addition, it is important to design so as not to generate a restriction that the added service is limited by the current system in consideration of forward compatibility. For example, in the 5G communication system, scalable numerology may be used for an inter-subcarrier spacing. Various services capable of simultaneously supporting the scalable numerology or having different TTIs may be simultaneously provided in one system. Inevitably, the 5G communication system needs to be able to utilize time and frequency resources more flexibly than existing LTE.

Hereinafter, the frame structure of LTE and LTE-A systems will be described in detail with reference to the accompanying drawings.

FIG. 1 is a diagram illustrating a basic structure of a time-frequency domain, which is a downlink radio resource region of an LTE system.

In FIG. 1, the horizontal axis represents a time domain and the vertical axis represents a frequency domain. A minimum transmission unit in the time domain is an OFDM symbol, $N_{symb}$ OFDM symbols 101 are gathered to form one slot 102, and two slots are gathered to form one subframe 103. The length of the slot is 0.5 ms and the length of the subframe is 1.0 ms. A radio frame 104 is a time-domain unit consisting of 10 subframes. A minimum transmission unit in the frequency domain is a subcarrier, and the bandwidth of the entire system transmission bandwidth may be constituted of $N_{BW}$ subcarriers 105 in total. A basic unit of resource in a time-frequency domain is a resource element (RE) 106 and may be represented as an OFDM symbol index and a subcarrier index. A resource block (RB or physical resource block (PRB) 107) is defined as $N_{symb}$ consecutive OFDM symbols 101 in the time domain and $N_{RB}$ consecutive subcarriers 108 in the frequency domain. Thus, one RB 108 is composed of $N_{symb} \times N_{RB}$ REs 106. In general, the minimum transmission unit of data is the RB unit. In an LTE system, $N_{symb}=7$, $N_{RB}=12$, and $N_{BW}$ is proportional to the bandwidth of the system transmission band.

Control signaling in a conventional 4G LTE system includes information such as: downlink scheduling assignment including information necessary for a UE to properly receive, demodulate, and decode downlink data on a physical downlink shared channel (PDSCH); uplink scheduling grant that notifies resources and a transmission format used by a UE to transmit uplink data on a physical uplink shared channel (PUSCH); acknowledgment of hybrid automatic repeat request (HARQ) for uplink data on PUSCH; and the like. In LTE, a physical downlink control channel (PDCCH) exists as a physical layer transport channel that transmits the downlink scheduling assignment and the uplink scheduling grant among the above-mentioned information, and these are transmitted over the entire band ahead of each subframe. That is, one subframe may be divided into a control region and a data region, and the control region is designed to occupy one, two, or three OFDM symbols. The size of the control region, expressed as the number of OFDM symbols, can vary dynamically depending on a particular situation, such as the size of the system bandwidth, whether a multimedia broadcast multicast services (MBSFN) subframe is configured for broadcasting, or the like, and this may be indicated to each UE through a control format indicator (CFI).

Next, downlink control information (DCI) in LTE and LTE-A systems will be described in detail.

In the LTE system, scheduling information on downlink data or uplink data is transmitted from an eNB to a UE through DCI. As to the DCI, a variety of formats are defined, and DCI formats which are determined according to whether the corresponding DCI is scheduling information on uplink data or scheduling information on downlink data, whether the corresponding DCI is compact DCI with a small amount of control information, whether spatial multiplexing using multiple antennas is applied to scheduled data, whether the corresponding DCI is DCI for power control, and the like may be applied and operated. For example, DCI format 1 which is scheduling control information on downlink data is configured to include at least the following control information.

Resource allocation type 0/1 flag: Notifies whether resource allocation method is type 0 or type 1. Type 0 uses bitmap scheme to allocate resources in units of resource block groups (RBGs). In LTE system, basic unit of scheduling is RB represented by time and frequency domain resources, and RBG is composed of plurality of RBs to become basic unit of scheduling in type 0 scheme. Type 1 allows specific RB to be allocated within RBG.

Resource block assignment: Notifies RB allocated for data transmission. Resource to be represented is determined according to system bandwidth and resource allocation method.

Modulation and coding scheme (MCS): Notifies modulation scheme used for data transmission and size of transport block that is data to be transmitted.

HARQ process number: Notifies process number of HARQ.

New data indicator: Notifies whether corresponding transmission is HARQ initial transmission or re-transmission.

Redundancy version: Notifies redundancy version of HARQ.

Transmit power control (TPC) command for physical uplink control channel (PUCCH): Notifies TPC command for PUCCH which is uplink control channel.

As described above, the DCI transmitted through the downlink control channel includes the following information.

Downlink scheduling assignment: PDSCH resource designation, transmission format, HARQ information, spatial multiplexing-related control information Uplink scheduling grant: PUSCH resource designation, transmission format, HARQ information, PUSCH power control Power control command for UE set Different types of control information generally have different DCI message sizes and are classified into different DCI formats. Downlink scheduling assignment information is transmitted in a DCI format 1, 1A, 2, 1C, 1D, 2, 2A, 2B, or 2C, uplink scheduling grant is transmitted in a DCI format 0 or 4, and a power control command is transmitted in a DCI format 3 or 3A. In general, since a plurality of UEs are simultaneously scheduled in downlink and uplink, a plurality of DCI transmissions are simultaneously performed.

The DCI is transmitted through a PDCCH or an enhanced PDCCH (EPDCCH), which is a downlink physical control channel through channel coding and modulation.

Cyclic redundancy check (CRC) is added to a DCI message payload, and the CRC is scrambled with a radio network temporary identifier (RNTI) corresponding to the identity of the UE. Different RNTIs are used depending on the purpose of the DCI message, for example, UE-specific data transmission, power control command, or random access response. That is, the RNTI is not explicitly transmitted but is included in a CRC calculation process and transmitted. Upon receiving the DCI message transmitted on the PDCCH, the UE checks the CRC using the allocated RNTI and if the CRC check result is correct, it can be seen that the corresponding message is transmitted to the UE.

PDCCH transmission and reception below may be understood as DCI transmission and reception on the PDCCH. In addition, the PDSCH and PUSCH transmission and reception may be understood as data transmission and reception on the PDSCH and PUSCH. PUCCH transmission and reception may be understood as uplink control information (UCI) transmission on the PUCCH.

Next, a downlink control channel in LTE and LTE-A systems will be described in detail with reference to the accompanying drawings.

Figure 2:
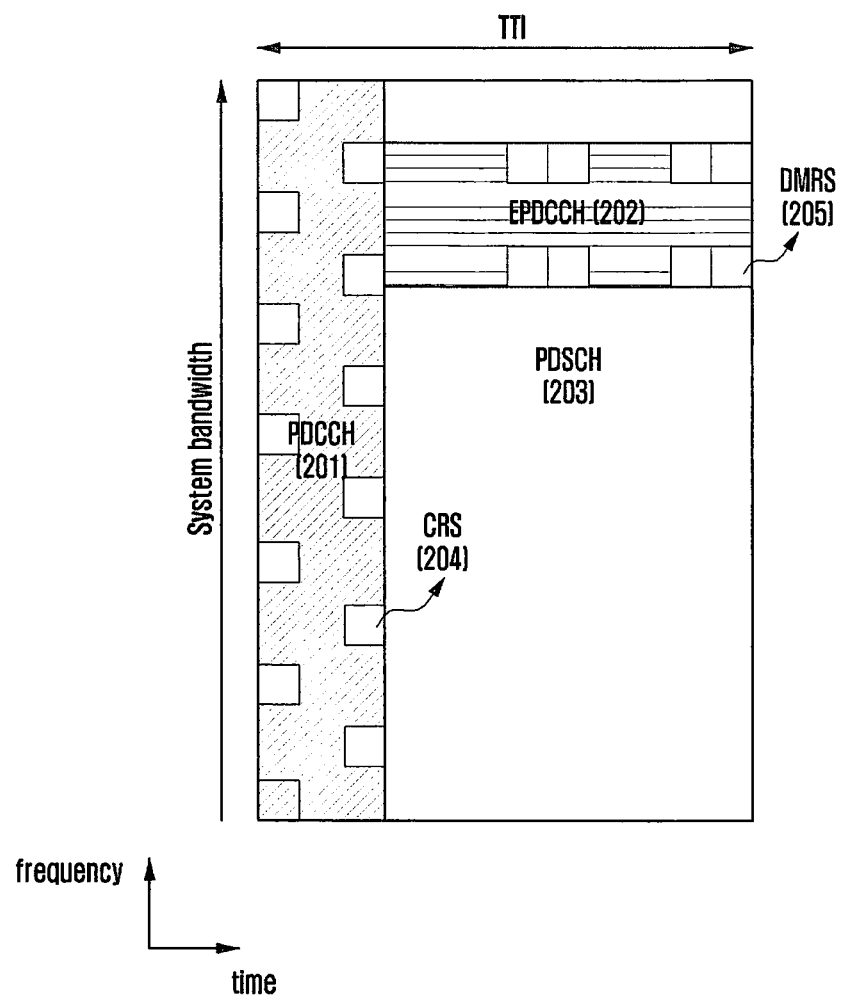
FIG. 2 is a diagram illustrating a PDCCH and an EPDCCH, which are downlink control channels of LTE.

FIG. 2 is a diagram illustrating a PDCCH 201 and an Enhanced PDCCH 202, which are downlink physical control channels through which a DCI of LTE is transmitted.

Referring to FIG. 2, the PDCCH 201 is subjected to time division multiplexing (TDM) with the PDSCH 203, which is a data transmission channel, and is transmitted over the entire system bandwidth. The region of the PDCCH 201 is represented by the number of OFDM symbols, which is indicated to a UE by a control format indicator (CFI) transmitted through a physical control format indicator channel (PCFICH). By allocating the PDCCH 201 to the OFDM symbol ahead of a subframe, the UE can decode downlink scheduling assignment as soon as possible, and thus decoding delay for a downlink shared channel (DL-SCH), that is, the entire downlink transmission delay can be reduced. Since one PDCCH carries one DCI message and a plurality of UEs can be simultaneously scheduled in downlink and uplink, a plurality of PDCCHs are simultaneously transmitted in each cell.

A cell-specific reference signal (CRS) 204 is used as a reference signal for decoding of the PDCCH 201. The CRS 204 is transmitted for each subframe over the entire band, and the scrambling and resource mapping of the CRS 204 are changed according to a cell identifier (ID). Since the CRS 204 is a reference signal commonly used by all UEs, UE-specific beamforming using the CRS may not be used. Thus, a multi-antenna transmission scheme for the PDCCH of LTE is limited to open-loop transmission diversity. The number of ports of the CRS is implicitly known to the UE through physical broadcast channel (PBCH) decoding.

The resource allocation of the PDCCH 201 is based on a control-channel element (CCE), and one CCE includes 9 resource element groups (REGs), that is, 36 REs in total. The number of CCEs required for a specific PDCCH 201 may be 1, 2, 4 or 8, which varies depending on a channel coding rate of a DCI message payload. Link adaptation of the PDCCH 201 is implemented by using different numbers of CCEs as described above.

Since the UE needs to detect a signal without knowing information about the PDCCH 201, the LTE system has defined a search space indicating a set of CCEs for blind decoding of the UE. The search space is composed of a plurality of sets according to an aggregation level (AL) of each CCE, which is not explicitly signaled and is implicitly defined through a function and a subframe number by the identity of the UE. In each subframe, the UE decodes the PDCCH 201 for all possible resource candidates that can be generated from the CCEs in the configured search space, and processes information declared as valid for the UE through CRC check.

The search space is classified into a UE-specific search space and a common search space. A certain group of UEs or all UEs may examine the common search space of the PDCCH 201 to receive cell common control information such as dynamic scheduling for system information or paging messages. For example, scheduling allocation information of DL-SCH for transmitting system information block (SIB)-1 including cell carrier information or the like may be received by examining the common search space of the PDCCH 201.

According to FIG. 2, the EPDCCH 202 is subjected to frequency division multiplexing (FDM) with the PDSCH 203 and transmitted. An eNB may properly allocate resources of the EPDCCH 202 and the PDSCH 203 through scheduling, thereby effectively supporting coexistence of data transmission and control channels for the existing LTE UE. However, since the EPDCCH 202 is allocated and transmitted over one subframe on the time axis, there is a loss in terms of transmission delay time. The plurality of EPDCCHs 202 constitute one set of EPDCCHs 202, and allocation of the set of EPDCCHs 202 is performed in units of PRB pairs. Location information for the set of EPDCCHs is configured in a UE-specific manner and is transmitted through remote radio control (RRC) signaling. Up to two sets of EPDCCHs 202 may be configured for each UE, and one set of EPDCCHs 202 may be configured to be simultaneously multiplexed to different UEs.

The resource allocation of the EPDCCH 202 is based on enhanced CCE (ECCE), and one ECCE may be composed of 4 or 8 enhanced REGs (EREGs). The number of EREGs for each ECCE varies depending on the length of a CP and the configuration of a subframe. One EREG is composed of 9 REs, so there may be 16 EREGs per PRB pair. The EPDCCH transmission scheme is divided into localized or distributed transmission according to the RE mapping scheme of the EREG. The aggregation level of the ECCE may be 1, 2, 4, 8, 16 or 32, which is determined by the CP length, the subframe configuration, and the EPDCCH format and transmission scheme.

The EPDCCH 202 only supports a UE-specific search space. Thus, a UE that desires to receive a system message must examine the common search space on the existing PDCCH 201.

Unlike the PDCCH 201, the EPDCCH 202 uses a demodulation reference signal (DMRS) 205 as a reference signal for decoding. Thus, precoding for the EPDCCH 202 can be configured by the eNB and UE-specific beamforming can be used for EPDCCH transmission. The UEs can perform decoding on the EPDCCH 202 without knowing which precoding is used through the DMRS 205. The EPDCCH 202 uses the same pattern as the DMRS of the PDSCH 203. However, unlike the PDSCH 203, up to four antenna ports may be used for the transmission of the DMRS 205 in the EPDCCH 202. The DMRS 205 is transmitted only in the corresponding PRB through which the EPDCCH is transmitted.

Antenna port configuration information of the DMRS 205 varies depending on a transmission scheme of the EPDCCH 202. In the case of the localized transmission scheme, an antenna port corresponding to the ECCE to which the EPDCCH 202 is mapped is selected on the basis of the ID of the UE. When different UEs share the same ECCE, that is, when a multi-user MIMO transmission scheme is used, a DMRS antenna port may be allocated to each UE. Alternatively, the DMRS 205 may be shared and transmitted. In this case, the respective UEs may be classified by the scrambling sequence of the DMRS 205 configured through higher layer signaling. In the case of the distributed transmission scheme, up to two antenna ports of the DMRS 205 are supported, and a diversity scheme of a precoder cycling method is supported. At this time, the DMRS 205 may be shared for all REs transmitted within one PRB pair.

Next, a search space for downlink control channel transmission in LTE and LTE-A systems will be described in detail with reference to the following.

In the LTE system, the entire PDCCH region consists of a set of CCEs in a logical region, and there is a search space composed of a set of CCEs. The search space is divided into a common search space and a UE-specific search space, and a search space for an LTE PDCCH is defined as follows.

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by
$L \{(Y_k + m') \bmod \lfloor N_{CCE,k}/L \rfloor\} + i$
where $Y_k$ is defined below, $i = 0, \ldots, L - 1$. For the common search space m' = m. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then m' = m, where $m = 0, \ldots, M^{(L)} - 1$. $M^{(L)}$ is the number of PDCCH candidates to monitor in the given search space.
Note that the carrier indicator field value is the same as ServCellIndex
For the common search spaces, $Y_k$ is set to 0 for the two aggregation levels L = 4 and L = 8.
For the UE-specific search space $S_k^{(L)}$ at aggregation level$_L$, the variable $Y_k$ is defined by
$Y_k = (A \cdot Y_{k-1}) \bmod D$
where $Y_{-1} = n_{RNTI} \neq 0$, A = 39827, D = 65537 and $k = \lfloor n_s/2 \rfloor$, $n_s$ is the slot number within a radio frame.
The RNTI value used for $n_{RNTI}$ is defined in subclause 7.1 in downlink and subclause 8 in uplink.

According to the definition of the search space for the PDCCH described above, the UE-specific search space is not explicitly signaled, but is implicitly defined through a function and a subframe number by UE identity. That is, since the UE-specific search space may change according to the subframe number, it means that the UE-specific search space may change over time. Through this, a problem in which a specific UE cannot use the search space by other UEs among the UEs (this is called a blocking problem) is solved. Specifically, if any UE is not scheduled in the corresponding subframe because all CCEs that are examined by the corresponding UE are already used by other UEs scheduled in the same subframe, such a problem may not occur in the next subframe since this search space changes over time. For example, even if parts of the UE-specific search spaces of UE #1 and UE #2 overlap each other in a specific subframe, overlapping in the next subframe may be expected to be different from the above-overlapping because the UE-specific search space changes for each subframe.

According to the definition of the search space for the PDCCH described above, in the case of the common search space, a certain group of UEs or all UEs have to receive the PDCCH, and thus, the search space is defined as a set of previously promised CCEs. In other words, the common search space does not change depending on the identity of the UE or the subframe number. Although the common search space exists for the transmission of various system messages, the common search space can also be used to transmit control information of individual UEs. Through this, the common search space may be used as a solution to a phenomenon that the UE is not scheduled due to a lack of available resources of the UE-specific search space.

The search space is a set of candidate control channels (hereinafter, referred to as PDCCH candidate groups) composed of CCEs that the UE should attempt to decode on a given aggregation level. Since the aggregation level is 1, 2, 4, or 8, the UE has a plurality of search spaces for each aggregation level. The number of PDCCH candidates to be monitored by a UE within the search space defined according to the aggregation level in the LTE PDCCH is defined in the following table.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |

TABLE 1-continued

| Type | Search space $S_k^{(L)}$ Aggregation level L | Size [in CCEs] | Number of PDCCH candidates $M^{(L)}$ |
|---|---|---|---|
|  | 4 | 8 | 2 |
|  | 8 | 16 | 2 |
| Common | 4 | 16 | 4 |
|  | 8 | 16 | 2 |

According to Table 1, the UE-specific search space supports aggregation levels {1, 2, 4, 8}. At this time, the UE-specific search space has {6, 6, 2, 2}-numbered PDCCH candidate groups, respectively. The common search space supports aggregation levels {4, 8}. At this time, the common search space has {4, 2}-numbered PDCCH candidate groups, respectively. The reason why the common search space supports only the aggregation levels of {4, 8} is to improve the coverage characteristics of the system message by using sufficient resources because the system message generally has to reach a cell edge.

A DCI transmitted to the common search space may use specific DCI formats, such as 0, 1A, 3, 3A, and 1C, which correspond to the use of the system messages or power control for a UE group. In addition, within the common search space, a DCI format in which data scheduled by the DCI is subjected to spatial multiplexing is not supported. A downlink DCI format of a DCI to be decoded in the UE-specific search space varies depending on a transmission mode configured for the corresponding UE. Since the configuration of the transmission mode is performed through RRC signaling, a time point (i.e., an accurate subframe number) when the corresponding configuration is applied to the corresponding UE is not designated. Accordingly, the UE may be operated so as not to lose a communication connection with an eNB by decoding the DCI format 1A at all times regardless of the transmission mode.

In the above, a method and a search space for transmitting and receiving downlink control channel and downlink control information in the conventional LTE and LTE-A systems have been described.

The PDCCH used in the conventional LTE system is not suitable for securing its flexibility in that the PDCCH is transmitted over the entire band and the size of a control region is configured in a cell-specific manner. Accordingly, 5G wireless communication systems consider a structure in which a control channel can be flexibly allocated according to various requirements of services. For example, the control region (control resource set, CORESET), which is defined as a time and frequency domain in which a PDCCH is transmitted in a 5G communication system, is configured to be positioned on a specific subband instead of being transmitted over the entire band on the frequency axis, and transmitted. Also, the control region is configured by the number of OFDM symbols having different sizes on the time axis, so that control information may be transmitted on the CORESET. There may be a plurality of control regions in one system, and a plurality of control regions may be configured in one UE. Therefore, it is possible to efficiently manage the control region according to whether a downlink control signal is transmitted, thereby flexibly supporting various services.

Hereinafter, a downlink control channel in a 5G communication system which is currently discussed will be described in more detail with reference to the accompanying drawings.

Figure 3:
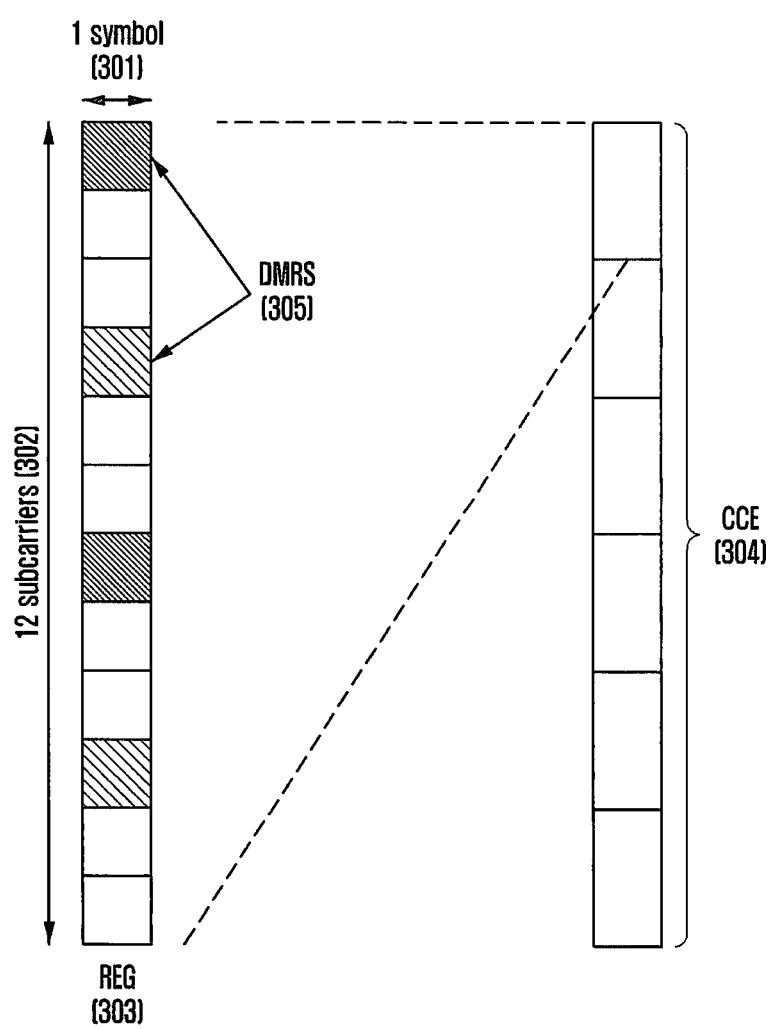
FIG. 3 illustrates a 5G downlink control channel.

FIG. 3 is a diagram illustrating an example of basic units of time and frequency resources constituting a downlink control channel that can be used in a 5G communication system. According to FIG. 3, the basic unit (REG) of the time and frequency resources constituting the control channel is composed of 1 OFDM symbol 301 on the time axis and 12 subcarriers 302 on the frequency axis, that is, 1 RB. By assuming that a time axis-basic unit is 1 OFDM symbol 301 in configuring the basic unit of the control channel, the data channel and the control channel may be subjected to TDM within one subframe. In addition, when the control channel is positioned ahead of the data channel, it is possible to reduce the processing time of a user, and thereby it is easy to meet delay time requirements. By configuring the base unit of the frequency axis of the control channel to 1 RB 302, FDM between the control channel and the data channel can be more efficiently performed.

By concatenating the REGs 303 shown in FIG. 3, control channel regions having various sizes can be configured. As an example, when the basic unit to which the downlink control channel is allocated in the 5G communication system is the CCE 304, one CCE 304 may be composed of a plurality of REGs 303. Referring to the REG 304 shown in FIG. 3 as an example, if the REG 303 consists of 12 REs and one CCE 304 consists of 6 REGs 303, the one CCE 304 may consist of 72 REs.

When the downlink control region is configured, the corresponding region may be composed of a plurality of CCEs 304, and a specific downlink control channel is mapped to one or more CCEs 304 according to an aggregation level (AL) in the control region and transmitted. The CCEs 304 in the control region are separated by numbers, and at this time, the numbers may be assigned according to a logical mapping scheme.

The basic unit of the downlink control channel illustrated in FIG. 3, that is, the REG 303 may include both REs to which a DCI is mapped and a region to which the DMRS 305, which is a reference signal for decoding the REs, is mapped. The DMRS 305 may be mapped and transmitted in consideration of the number of antenna ports used for transmitting a downlink control channel. FIG. 3 shows an example in which two antenna ports are used. At this time, there may be a DMRS 306 transmitted for an antenna port #0 and a DMRS 307 transmitted for an antenna port #1. DMRSs for different antenna ports can be multiplexed in various ways. FIG. 3 shows an example in which DMRSs corresponding to different antenna ports are transmitted to be orthogonal to each other in different REs. In this manner, the DMRS according to each antenna port may be subjected to FDM and transmitted or may be subjected to CDM and transmitted. In addition, there may be various types of DMRS patterns, which may be associated with the number of antenna ports.

Figure 4:
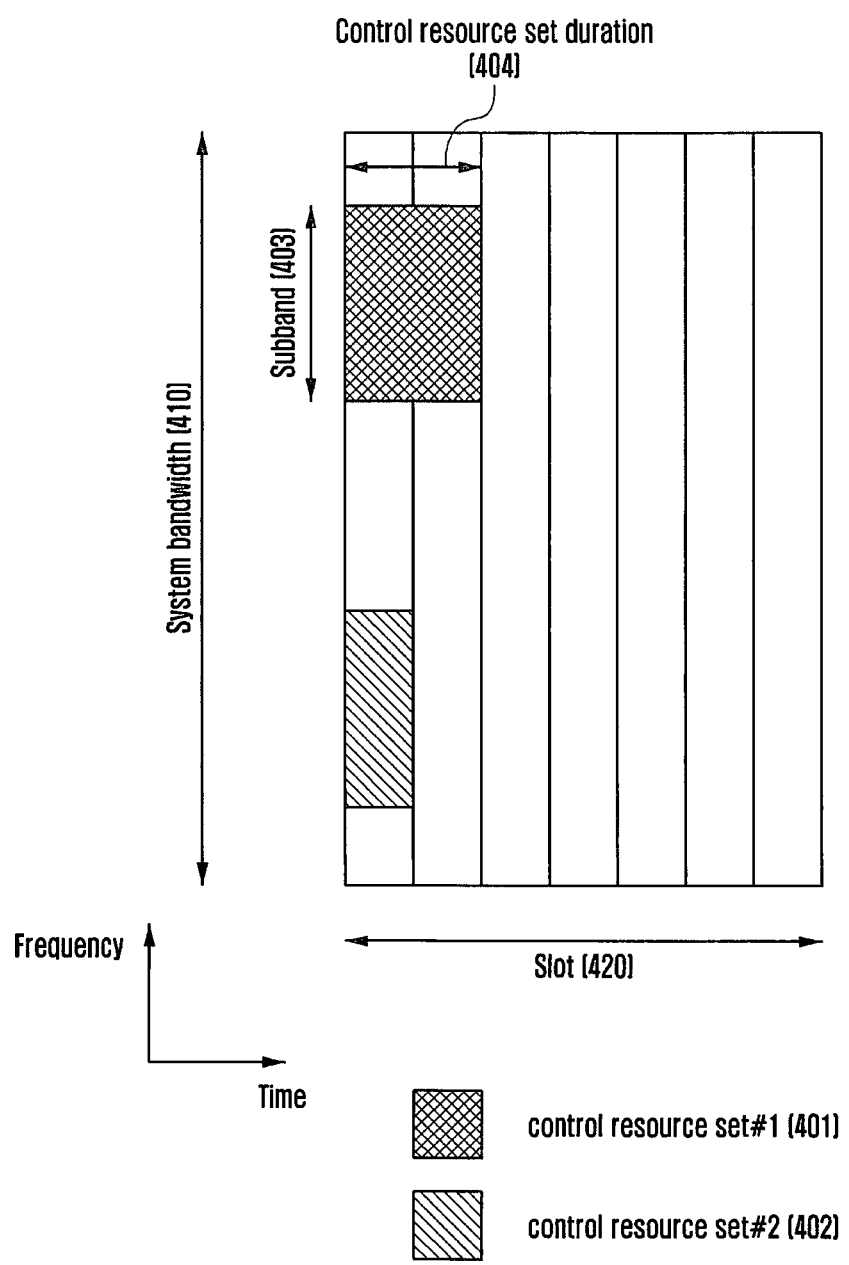
FIG. 4 illustrates a method of allocating a resource region for a 5G downlink control channel.

FIG. 4 is a diagram illustrating an example of a control region in which a downlink control channel is transmitted in a 5G wireless communication system. FIG. 4 shows an example which two control regions (control region #1 401 and control region #2 402) are configured within a system bandwidth 410 on the frequency axis and one slot 420 on the time axis (in FIG. 4, it is assumed that one slot includes 7 OFDM symbols). The control regions 401 and 402 may be configured to be located on a specific subband 403 within the overall system bandwidth 410 on the frequency axis. In addition, the control region may be configured as one or a plurality of OFDM symbols on the time axis and may be defined as a control region length (control resource set duration) 404. In FIG. 4, the control region #1 401 is configured as the control resource set duration of two symbols, and the control region #2 402 is configured as the control region length of one symbol.

In the above-described 5G communication system, the control region may be configured in a UE by an eNB through higher layer signaling (for example, system information and RRC signaling). Configuring the control region in the UE means providing information such as the position of the control region, subbands, resource allocation of the control region, control region length, and the like. For example, the following information may be included.

TABLE 2

Configuration information 1. RB allocation information on frequency axis
Configuration information 2. Control region start symbol
Configuration information 3. Control region symbol length
Configuration information 4. REG bundling size
Configuration information 5. Transmission mode (interleaved transmission scheme or non-interleaved transmission scheme)
Configuration information 6. Search space type (common search space, group-common search space, UE-specific search space)
Configuration information 7. Monitoring period (monitoring period and monitoring time point (occasion))
Others In addition to the above configuration information, various types of information necessary for transmitting the downlink control channel may be configured in the UE. The monitoring period of the configuration information 7 may mean a time interval for monitoring a corresponding control region, may mean a specific time pattern for monitoring the control region, or may mean a combination of the time interval and the specific time pattern for monitoring the control region. For example, the monitoring period may be configured to 10 ms, that is, one radio frame, and specific slots to perform PDCCH monitoring among 10 slots within 10 ms may be selected and configured in one pattern. Here, the PDCCH may be monitored every 10 ms in the configured pattern and period.

In addition, in the 5G communication system, the eNB may configure the following information to the UE in relation to blind decoding for the downlink control channel.

TABLE 3

Configuration information 1. Aggregation level set Aggregation level set monitored by UE
Configuration information 2. DCI format size set monitored by UE
Configuration information 3. Number of PDCCH candidate groups for each aggregation level monitored by UE
Configuration information 4. Number of PDCCH candidate groups for each DCI format size monitored by UE
Others In addition to the above configuration information, various parameters may be configured in the UE. The number of PDCCH candidate groups in the configuration information may be configured as zero. Configuring the number of PDCCH candidate groups as 0 may mean that the UE does not perform blind decoding. For example, if the number of PDCCH candidate groups for a specific aggregation level is configured as 0, the UE does not perform blind decoding in the search space for the corresponding aggregation level. If the number of PDCCH candidate groups for all aggregation levels is configured as 0, the UE does not perform blind decoding for the entire search space. This is the same as the operation of not performing monitoring on the PDCCH. This may also be the same as the UE operating in a sleep mode. Here, the sleep mode may mean that the UE does not perform PDCCH monitoring and data transmission/reception. The configuration information may be configured for each control region or for each search space. In addition, the configuration information may be transmitted from the eNB to the UE through higher layer signaling, for example, RRC signaling.

In the above, various configuration methods for the downlink control channel in the 5G communication system have been described.

The following describes a configuration method for a bandwidth part considered in the 5G communication system.

Figure 5:
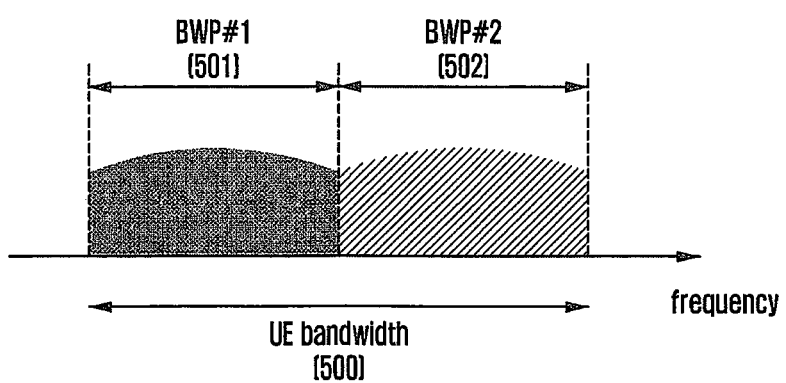
FIG. 5 is a diagram illustrating a method of configuring a bandwidth part in a 5G communication system.

FIG. 5 is a diagram illustrating an example of configuration of a bandwidth part in a 5G communication system. FIG. 5 shows an example in which a UE bandwidth 500 is configured as two bandwidth parts, that is, a bandwidth part #1 501 and a bandwidth part #2 502. An eNB may configure one or a plurality of bandwidth parts to a UE, and may configure the following information for each bandwidth part.

TABLE 4

Configuration information 1. Bandwidth of bandwidth part (number of PRBs that constitute bandwidth part)
Configuration information 2. Frequency position of bandwidth part (this information includes offset value compared to reference point, and reference point may be, for example, center frequency of carrier, synchronization signal, synchronization signal raster, and the like.
Configuration information 3. Numerology of bandwidth part (e.g., subcarrier interval, cyclic prefix (CP) length, etc.
Others In addition to the configuration information, various parameters related to the bandwidth part may be configured to the UE. The above information may be transmitted to the UE by the eNB through higher layer signaling, for example, RRC signaling. At least one bandwidth part of the configured one or plurality of bandwidth portions may be activated. Whether to activate the configured bandwidth part may be transmitted from the eNB to the UE through RRC signaling in a semi-static manner, or may be dynamically transmitted from the eNB to the UE through a MAC control element (CE) or a DCI.

The configuration of the bandwidth part supported by the 5G communication system may be used for various purposes.

As an example, when the bandwidth supported by the UE is smaller than the system bandwidth, the corresponding bandwidth may be supported through the configuration of the bandwidth part. For example, by configuring the frequency position (configuration information 2) of the bandwidth part to a UE in Table 4, the UE can transmit and receive data at a specific frequency position within the system bandwidth.

As another example, an eNB may configure a plurality of bandwidth parts to a UE for the purpose of supporting different numerologies. For example, in order to support both data transmission/reception using a subcarrier interval of 15 kHz and a subcarrier interval of 30 kHz to a certain terminal, two bandwidth parts may be configured to use the subcarrier interval of 15 kHz and 30 kHz, respectively. Different bandwidth parts may be subjected to FDM, and when data is desired to be transmitted and received at a specific subcarrier interval, the bandwidth part configured at the corresponding subcarrier interval may be activated.

As another example, for the purpose of reducing power consumption of a UE, an eNB may configure bandwidth parts having different bandwidths to the UE. For example, when a UE supports a very large bandwidth, for example, a bandwidth of 100 MHz and always transmits and receives data in the corresponding bandwidth, it may cause very large power consumption. In particular, in the absence of traffic, it is very inefficient in terms of power consumption to monitor an unnecessary downlink control channel for a large bandwidth of 100 MHz. Therefore, in order to reduce the power consumption of the UE, the eNB may configure a bandwidth part of a relatively small bandwidth, for example, a bandwidth part of 20 MHz to the UE. In a situation where there is no traffic, the UE may perform a monitoring operation in the bandwidth part of 20 MHz, and may transmit and receive data using the bandwidth part of 100 MHz according to the instruction of the eNB when data is generated.

As described above, in the 5G communication system, the eNB may configure various system parameters in order to reduce power consumption of the UE according to the monitoring of the PDCCH. In addition, the eNB may configure a monitoring period for the PDCCH to the UE. In the conventional LTE system, the UE always performs downlink control channel monitoring at one subframe period, that is, 1 ms period, whereas in the 5G communication system, various monitoring periods may be configured. For example, by configuring a long monitoring period in an environment with less traffic, decoding of unnecessary PDCCH of the UE can be minimized.

In addition, the ENB may configure the number of times of blind decoding for the PDCCH to the UE, thereby adjusting the number of times of blind decoding. In the conventional LTE system, the UE always had to perform blind decoding 44 times for one component carrier, whereas in the 5G communication system, the number of times of blind decoding may be adjusted according to the configuration of the eNB.

In addition, the eNB may configure a bandwidth for monitoring the PDCCH to the UE. By configuring a bandwidth part having a small bandwidth size to the UE, it is possible to effectively reduce the power consumption of the UE generated when monitoring the PDCCH. The configuration information may be transmitted from the eNB to the UE through higher layer signaling, for example, RRC signaling in a semi-static manner.

The disclosure proposes a method of dynamically changing configuration information on a PDCCH in order to more effectively reduce power consumption of a UE according to PDCCH monitoring. The eNB may inform the UE of one or more pieces of PDCCH-related configuration information, and may indicate a time point and configuration at which the UE operates through L1 signaling using a dynamic indicator, for example, downlink control information (DCI) or higher layer signaling such as medium access control (MAC) control element (CE).

Hereinafter, embodiments of the disclosure will be described in detail with the accompanying drawings. Hereinafter, an embodiment of the disclosure will be described using a 5G mobile communication technology (5G, new radio (NR)) as an example, but the disclosure may be applied to other communication systems having a similar technical background or channel form. That is, the embodiment of the disclosure can be applied to other communication systems through some modifications without departing from the scope of the disclosure by the judgment of those skilled in the art.

In addition, in describing the disclosure, when it is determined that a detailed description of related functions or configurations may unnecessarily obscure the subject matter of the disclosure, the detailed description thereof will be omitted. Terms to be described later are terms defined in consideration of functions in the disclosure, and may be changed according to intentions or customs of users or operators. Therefore, the definition should be made based on the contents throughout the specification.

First Embodiment

The first embodiment of the disclosure proposes a method of dynamically changing a PDCCH configuration in order to more effectively reduce power consumption of a UE according to PDCCH monitoring.

Here, the PDCCH configuration may include the following configuration information. The following configuration information for the PDCCH may be transmitted from an eNB to a UE in higher layer signaling (e.g., RRC signaling).

Configuration 1. Monitoring interval for PDCCH (corresponding to configuration information 7 of Table 2 above)

Configuration 2. Search space for PDCCH (corresponding to configuration information of Table 3 above)

Configuration 3. Bandwidth part (or bandwidth for monitoring PDCCH) (corresponding to configuration information of Table 4 above)

In the first embodiment of the disclosure, the eNB may further transmit an indicator (hereinafter, a configuration switching indicator) for dynamically switching the PDCCH configurations to the UE. In this case, the configuration switching indicator may indicate a dynamic configuration change for one or multiple combinations of the PDCCH configurations. For example, the configuration switching indicator may be an indicator indicating a dynamic change for configuration 3 (bandwidth for monitoring the PDCCH). As another example, "configuration switching indicator" may be an indicator indicating to switch both configuration 1 (monitoring period for PDCCH) and configuration 2 (search space for PDCCH).

The PDCCH configuration and configuration switching indicator terms defined in the above are used without changing the meaning in the following description of the disclosure.

In the following, a method of dynamically changing the above-described configuration 1, 2, and 3 will be specifically described as <Embodiment 1-1>, <Embodiment 1-2>, and <Embodiment 1-3>, respectively.

Embodiment 1-1

Figure 6:
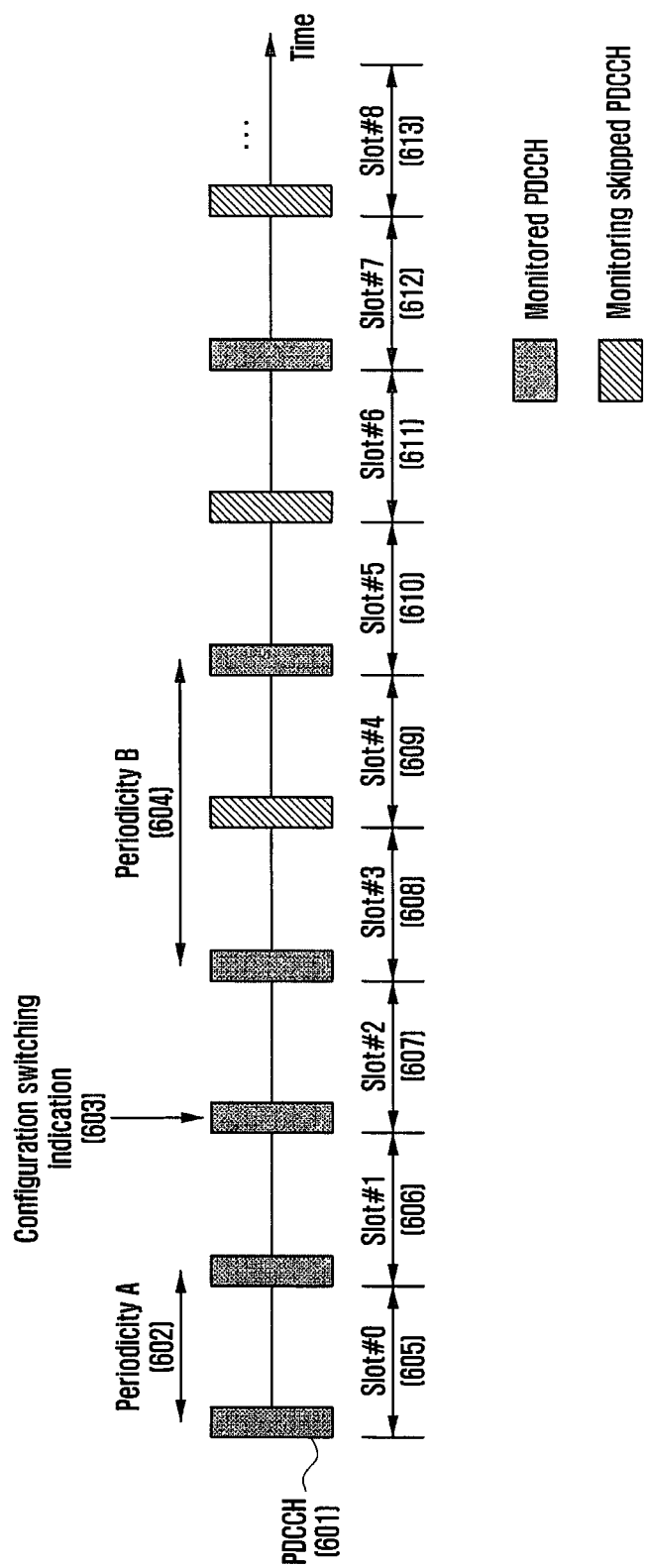
FIG. 6 is a diagram illustrating a method of changing a dynamic configuration for a PDCCH monitoring period according to embodiment 1-1 of the disclosure.

FIG. 6 is a diagram illustrating a dynamic configuration switching method for PDCCH monitoring according to Embodiment 1-1 of the disclosure.

As described in Table 2, an eNB may configure a monitoring period for a PDCCH to a UE through higher layer signaling, for example, RRC signaling. FIG. 6 shows a case in which an eNB configures one slot (period A 602) as a monitoring period for a PDCCH 601 to the UE, and thus, a UE monitors the PDCCH 601 with a monitoring period corresponding to the period A 602. In FIG. 6, the UE monitors the PDCCH 601 in a slot #0 605, a slot #1 606, and a slot #2 607 according to the monitoring period A 602.

In Embodiment 1-1 of the disclosure, the eNB may further transmit an indicator for changing the PDCCH monitoring period to the UE. The eNB may transmit a configuration switching indicator to the UE in a specific slot, and the UE may receive the configuration switching indicator from the eNB and may perform monitoring for the PDCCH by applying the changed configuration according to the configuration switching indicator from a specific time point. In FIG. 6, the base station may transmit a configuration switching indicator 603 for monitoring PDCCH in a slot #2 607 to the terminal. After receiving the indicator, the base station transmits the changed configuration according to the indicator. Application may be performed from 3 (608) to perform monitoring on the PDCCH. In FIG. 6, the eNB may transmit the configuration switching indicator 603 for PDCCH monitoring to the UE in the slot #2 607, and the UE may receive the corresponding indicator and may then apply the changed configuration according to the indicator starting from a slot #3 608 to perform monitoring on the PDCCH. In FIG. 6, the monitoring period is changed from one slot (period A 602) to two slots (period B 604) starting from the slot #3 608 and the changed monitoring period is applied. Accordingly, the UE may monitor the PDCCH in two slot periods from the slot #3 608, and thus may monitor the PDCCH in the slot #3 608, a slot #5 610, and a slot #7 612.

The configuration switching indicator 603 described above may directly inform the PDCCH monitoring period. For example, the configuration switching indicator may select and indicate one of N PDCCH monitoring periods with $\log_2 N$ bits. Table 5 below shows an example of indicating a PDCCH monitoring period with 2 bits.

TABLE 5

| Indicator value | PDCCH monitoring period |
|---|---|
| 00 | 1 slot period |
| 01 | 2 slot periods |

TABLE 5-continued

| Indicator value | PDCCH monitoring period |
|---|---|
| 10 | 3 slot periods |
| 11 | 4 slot periods |

Values for the PDCCH monitoring period proposed in the above are merely examples and may be various values such as one or a plurality of slot periods in at least one OFDM symbol period.

Alternatively, the eNB may configure in advance one or multiple PDCCH monitoring periods to the UE through higher layer signaling (e.g., RRC signaling), and the configuration switching indicator 603 may be mapped to one of the previously configured PDCCH monitoring periods configured in advance by the eNB, thereby indicating the monitoring period. For example, the configuration switching indicator may select and indicate one of N preset PDCCH monitoring periods with $\log_2 N$ bits. Each of Table 6 and 7 shows an example of indicating the PDCCH monitoring period by using a 1-bit indicator and a 2-bit indicator, respectively.

TABLE 6

| Indicator value | PDCCH monitoring period |
|---|---|
| 0 | PDCCH monitoring period A configured through higher layer signaling |
| 1 | PDCCH monitoring period B configured through higher layer signaling |

TABLE 7

| Indicator value | PDCCH monitoring period |
|---|---|
| 00 | PDCCH monitoring period A configured through higher layer signaling |
| 01 | PDCCH monitoring period B configured through higher layer signaling |
| 10 | PDCCH monitoring period C configured through higher layer signaling |
| 11 | PDCCH monitoring period D configured through higher layer signaling |

The configuration switching indicator 603 for the PDCCH monitoring period described above may be transmitted from the eNB to the UE through medium access control (MAC) control element (CE) signaling or L1 signaling (e.g., a common DCI {this may be a cell-specific DCI}, a group-common DCI {this may be a common DCI to a UE constituting a specific group}, or UE-specific DCI).

A time point when the PDCCH configuration switching according to the configuration switching indicator 603 for the above-described PDCCH monitoring period is applied is as follows. The time point when the configuration switching is applied may depend on a predefined value (e.g., after the configuration switching indicator is received, the PDCCH configuration switching is applied starting from one behind N(≥1) slot). Alternatively, the eNB may configure the above-described time point to the UE through higher layer signaling (e.g., RRC signaling). Alternatively, the time point may be included in the content of the configuration switching indicator 603 and transmitted. Alternatively, the time point may be determined in a combination of the above-mentioned methods. The UE may receive the configuration switching indicator 603 for the PDCCH monitoring period and may then apply the changed configuration starting from the time point obtained by the above methods.

A time during which the PDCCH configuration switching according to the configuration switching indicator 603 for the above-described PDCCH monitoring period is applied is as follows. An interval (or time) during which the configuration switching is applied depends on a predefined value (e.g., the configuration switching is applied during N(≥1) slot). Alternatively, the eNB may configure the above-described interval (or time) to the UE through higher layer signaling (e.g., RRC signaling). Alternatively, the interval (or time) may be included in the content of the configuration switching indicator 603 and transmitted. Alternatively, the interval (or time) may be determined whether a specific condition is satisfied (e.g., if the next configuration switching indicator 603 is received, the interval (or time) is applied until one before the next configuration switching indicator or until the next configuration indicator is applied). Alternatively, the interval (or time) may be determined in a combination of the above-described methods. The UE may receive the configuration switching indicator 603 for the PDCCH monitoring period and may then apply the changed configuration during the time obtained by the above methods.

The eNB may configure to monitor one or a plurality of control regions to the UE, and the configuration switching for the PDCCH monitoring period described above may be commonly applied to all the control regions monitored by the UE or may be applied differently for each control region. Alternatively, the configuration switching may be commonly applied to all search spaces within each control region or may be applied differently for each search space. For example, the configuration switching for the monitoring period may be differently applied for each common search space and UE-specific search space. Alternatively, the configuration switching for the monitoring period may be differently applied for each aggregation level within the search space. Alternatively, the configuration switching may be commonly applied to all DCI formats monitored by the UE or differently applied for each DCI format. Alternatively, the configuration switching for the PDCCH monitoring period may be applied different according to a service for which data scheduled by the DCI is used among services for the 5G communication system or numerology applied to the control region.

For example, the monitoring period of a DCI for power control of the UE such as a DCI format 3 or 3A among THE DCIs monitored by the UE or a DCI format 1C for scheduling of system information or paging messages may be configured to be longer than the monitoring period of a DCI format for UE-specific data scheduling.

Embodiment 1-2

Figure 7:
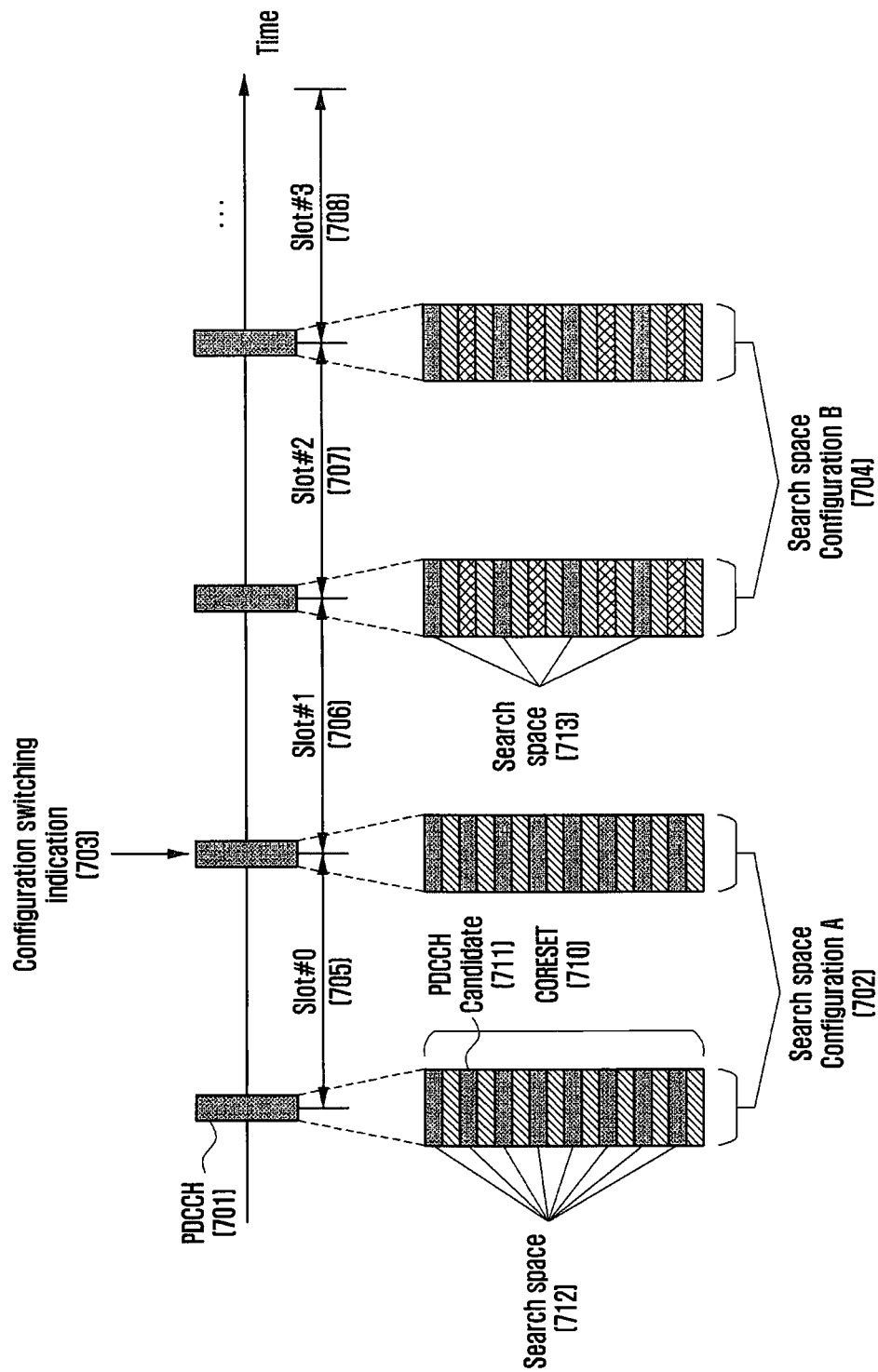
FIG. 7 is a diagram illustrating a method of changing a dynamic configuration for a PDCCH search space according to embodiment 1-2 of the disclosure.

FIG. 7 is a diagram illustrating a dynamic configuration switching method for a PDCCH search space according to Embodiment 1-2 of the disclosure.

As described in Table 3, the eNB may configure the number of PDCCH candidate groups to be monitored by the UE through higher layer signaling, for example, RRC signaling, as a configuration for the PDCCH search space. For example, the eNB may configure the number of PDCCH candidate groups to be monitored by the UE for each aggregation level and/or for each DCI format size to the UE.

The search space for the UE to perform blind decoding may be determined by the number of PDCCH candidate groups described above.

In FIG. 7, a search space 712 of one UE is shown. The search space 712 may be defined as a set of PDCCH candidate groups 711 in a control region. The eNB may configure the number of PDCCH candidate groups 711 to the UE, and thus the search space 712 may be determined. FIG. 7 shows an example in which the eNB configures a total number of eight PDCCH candidate groups 711 to the UE. This is defined as the search space configuration A 702. The UE may perform monitoring on the PDCCH 701 in the configured search space, and in FIG. 7, the UE monitors the PDCCH 701 by the search space configuration A 702 in a slot #0 705 and a slot #1 706, respectively.

In Embodiment 1-2 of the disclosure, the eNB may further transmit an indicator for switching the configuration of the search space 712 to the UE. The eNB may transmit a configuration switching indicator to the UE in a specific slot, and the UE may receive the configuration switching indicator from the eNB, and may then apply the changed configuration according to the configuration switching indicator starting from a specific time point to determine the search space. Thereafter, the UE may perform blind decoding on the PDCCH.

In FIG. 7, the eNB may transmit the configuration switching indicator 703 for the PDCCH search space to the UE in the slot #1 706. After receiving the corresponding indicator, the UE may apply the changed configuration according to the indicator starting from the slot #2 707 to perform blind decoding on the PDCCH. In FIG. 7, the PDCCH search space configuration is switched from the search space configuration A 702 to the search space configuration B 704 starting from the slot #2 707 and is applied. In FIG. 7, the search space configuration B 704 is obtained by configuring a total number of four PDCCH candidate groups 711, and the UE may perform blind decoding on the search space 713 constituted of 4 PDCCH candidate groups 711 starting from the slot #2 707.

The configuration switching indicator 703 described above may directly inform configuration information about the search space. For example, the configuration switching indicator may inform the UE of a scaling value for the number of PDCCH candidate groups to be actually monitored relative to the total number of PDCCH candidate groups. If the entire search space is composed of X PDCCH candidate groups, and the number of PDCCH candidate groups to be actually monitored is configured as Y, an a value satisfying $Y=\alpha \cdot X$ may be indicated by the configuration switching indicator. Here the value of $\alpha$ can be defined as an arbitrary real number satisfying, for example, $0 \leq \alpha \leq 1$. If $\alpha=1$, it means that the UE performs blind decoding on the entire search space (or the entire configured search space), and if $\alpha=0$, it means that the UE does not perform blind decoding on the search space, that is, does not perform monitoring on the PDCCH. The configuration switching indicator may select and indicate one of N pieces of configuration information with $\log_2 N$ bits. Each of Tables 8 and 9 below shows an example in which a scaling value for the number of PDCCH candidate groups is indicated by 2 bits.

TABLE 8

| Indicator value | Scaling value |
| --- | --- |
| 00 | 1 |
| 01 | 0.75 |

TABLE 8-continued

| Indicator value | Scaling value |
| --- | --- |
| 10 | 0.5 |
| 11 | 0.25 |

TABLE 9

| Indicator value | Scaling value |
| --- | --- |
| 00 | 1 |
| 01 | 0.5 |
| 10 | 0.25 |
| 11 | 0 |

In addition to the above-described method of notifying the scaling value information as a method of directly indicating the configuration information of the search space, there are a method of notifying an aggregation level to be monitored by the UE, a method of indicating a partial search space to be monitored by the UE, and a method of indicating specific time and/or frequency resources of the control region to be monitored by the UE. Alternatively, a combination of the above-described various types of information may be notified to the UE.

For example, a combination of the aggregation level that the UE should monitor and a scaling value for the number of PDCCH candidate groups for each aggregation level may be notified. Table 10 and Table 11 below show these examples.

TABLE 10

| Indicator value | Aggregation level and scaling value |
| --- | --- |
| 00 | Scaling value of 1 is applied to AL = 1, 2, 4, 8 |
| 01 | Scaling value of 0.5 is applied to AL = 1, 2, 4, 8 |
| 10 | Scaling value of 1 is applied to AL = 1, 2<br>Scaling value of 0.25 is applied to AL = 4, 8 |
| 11 | Scaling value of 0.25 is applied to AL = 1, 2<br>Scaling value of 1 is applied to AL = 4, 8 |

The indicator value of 01 of the configuration switching indicator can be used when there is not much traffic. The indicator value of 10 may be used when the channel condition is good or a distance between the eNB and the UE is shorter because the DCI is highly likely to be transmitted in the search space of the low aggregation level when the channel condition is good. The indicator value of 11 may be used when the channel condition is not good or the UE is located at the cell edge because the DCI is highly likely to be transmitted in the search space of the high aggregation level when the channel condition is not good.

TABLE 11

| Indicator value | Aggregation level and scaling value |
| --- | --- |
| 00 | Scaling value of 1 is applied to AL = 1, 2, 4, 8 |
| 01 | Scaling value of 0.5 is applied to AL = 1, 2, 4, 8 |
| 10 | Scaling value of 0.25 is applied to AL = 1, 2, 4, 8 |
| 11 | Scaling value of 0 is applied to AL = 1, 2, 4, 8 |

In Table 11, when the indicator value of 00 is indicated to the UE, the UE can perform blind decoding on the entire search space (or the entire configured search space), and when the indicator value of 11 is indicated, the UE does not perform monitoring on the PDCCH (this is the same as a case in which the UE operates in a sleep mode).

When the UE operates according to the PDCCH configuration corresponding to the indicator value of 00 (perform monitoring on the entire search space) and receives the indicator value of 11 from the configuration switching indicator, the UE may not perform monitoring on the PDCCH (that is, the UE may operate in a sleep mode).

When the UE operates according to the PDCCH configuration corresponding to the indicator value of 11 (does not performing monitoring on the PDCCH, operates in the sleep mode) and receives the indicator value of 00 from the configuration switching indicator, the UE may start monitoring the PDCCH.

The configuration value for the PDCCH search space described in the above table is merely an example, and may have various values.

As another method, the eNB may configure in advance the configuration of one or more PDCCH search spaces to the UE through higher layer signaling (for example, RRC signaling), and the configuration switching indicator 703 may indicate a specific configuration in a method in which the configuration switching indicator 703 is mapped with one of the PDCCH search space configurations configured in advance by the eNB. For example, one of N PDCCH search space configurations configured in advance may be selected and indicated by using an indicator of $\log_2 N$ bits. Table 12 below shows an example of indicating configuration information on the PDCCH search space using a 2-bit indicator.

TABLE 12

| Indicator value | PDCCH search space configuration |
| --- | --- |
| 00 | PDCCH search space configuration A through higher layer signaling |
| 01 | PDCCH search space configuration B through higher layer signaling |
| 10 | PDCCH search space configuration C through higher layer signaling |
| 11 | PDCCH search space configuration D through higher layer signaling |

The configuration switching indicator 703 for the PDCCH search space described above is transmitted from the eNB to the UE in the form of MAC CE signaling or L1 signaling (e.g., common DCI, group-common DCI, or UE-specific DCI).

A time point when the PDCCH configuration switching according to the configuration switching indicator 703 for the above-described PDCCH search space is applied is as follows. The time point when the configuration switching is applied may depend on a predefined value (e.g., after the configuration switching indicator is received, the PDCCH configuration switching is applied starting from one behind N(≥1) slot). Alternatively, the eNB may configure the above-described time point to the UE through higher layer signaling (e.g., RRC signaling). Alternatively, the time point may be partially included in the content of the configuration switching indicator 703 and transmitted. Alternatively, the time point may be determined in a combination of the above-mentioned methods. The UE may receive the configuration switching indicator 703 for the PDCCH search space and may then apply the changed configuration starting from the time point obtained by the above methods.

A time during which the PDCCH configuration switching according to the configuration switching indicator 703 for the above-described PDCCH search space is applied is as follows. An interval (or time) during which the configuration switching is applied depends on a predefined value (e.g., the configuration switching is applied during N(≥1) slot). Alternatively, the eNB may configure the above-described interval (or time) to the UE through higher layer signaling (e.g., RRC signaling). Alternatively, the interval (or time) may be included in the content of the configuration switching indicator 703 and transmitted. Alternatively, the interval (or time) may be determined whether a specific condition is satisfied (e.g., if the next configuration switching indicator 703 is received, the interval (or time) is applied until one before the next configuration switching indicator or until the next configuration indicator is applied). Alternatively, the interval (or time) may be determined in a combination of the above-described methods. The UE may receive the configuration switching indicator 703 for the PDCCH monitoring period and may then apply the changed configuration during the time obtained by the above methods.

The eNB may configure to monitor one or a plurality of control regions to the UE, and the configuration switching for the PDCCH search space described above may be commonly applied to all the control regions monitored by the UE or may be applied differently for each control region.

Alternatively, the configuration switching may be commonly applied to all search spaces within each control region or may be applied differently for each search space. For example, the configuration switching for the number of PDCCH candidate groups (the number of times of blind decoding in the same manner) to be monitored by the UE may be applied differently for each search space and UE-specific search space. Alternatively, the configuration switching for the number of PDCCH candidate groups (the number of times of blind decoding in the same manner) to be monitored by the UE may be applied differently for each aggregation level within the search space. Alternatively, the configuration switching may be commonly applied to all DCI formats monitored by the UE, or may be applied differently for each DCI format.

Embodiment 1-3

Figure 8:
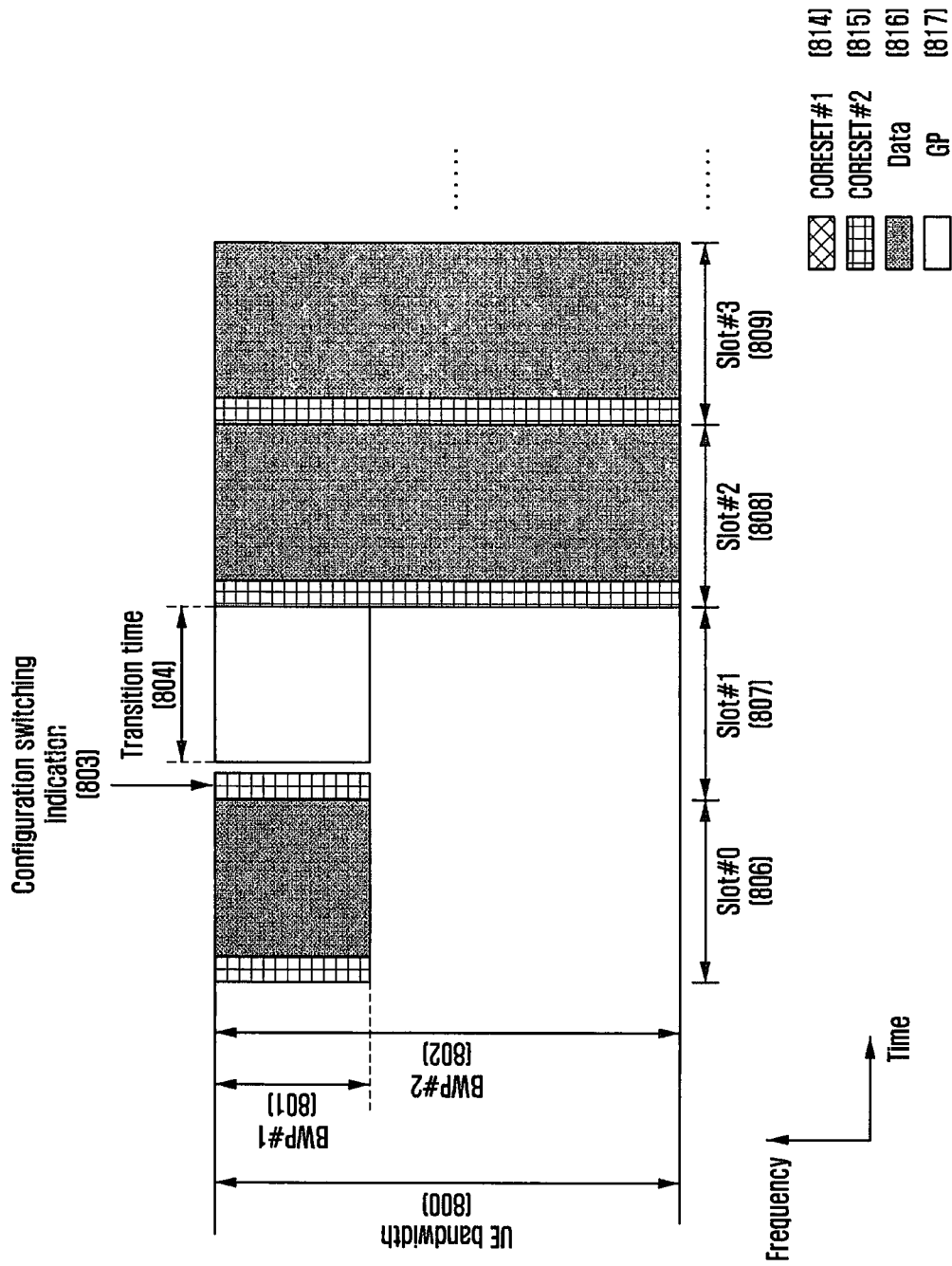
FIG. 8 is a diagram illustrating a dynamic configuration change for a PDCCH monitoring bandwidth according to embodiment 1-3 of the disclosure.

FIG. 8 is a diagram illustrating a dynamic configuration switching method for a bandwidth part according to Embodiment 1-3 of the disclosure.

As described in Table 4, the eNB may configure one or a plurality of bandwidth parts to the UE, and may notify information about the bandwidth of the bandwidth part, the frequency position of the bandwidth part, the numerology of the bandwidth part, etc., as the configuration for each bandwidth part. FIG. 8 shows an example in which two bandwidth parts, that is, a bandwidth part #1 (BPW #1, 801) and a bandwidth part #2 (BWP #2, 802) are configured in a UE bandwidth 800 to one UE. One or a plurality of bandwidth parts among the configured bandwidths may be activated, and in FIG. 8, an example in which one bandwidth part is activated is considered. In FIG. 8, a bandwidth portion #1 801 is activated among the bandwidth parts configured in a slot #0 806, and the UE may monitor the PDCCH in a control region #1 814 configured in the bandwidth part #1 801, and may transmit and receive data 816 in the bandwidth part #1 801. The control region in which the UE receives the PDCCH may vary according to which bandwidth part of the configured bandwidth parts is activated, and thus the bandwidth in which the UE monitors the PDCCH may vary.

In Embodiment 1-3 of the disclosure, the eNB may further transmit an indicator for switching the configuration of the bandwidth part to the UE. Here, switching the configuration for the bandwidth part may be regarded as the same as activating a specific bandwidth part (for example, changing the activation from the bandwidth part A to the bandwidth part B). The eNB may transmit the configuration switching indicator to the UE in a specific slot. After receiving the configuration switching indicator from the eNB, the UE may determine a bandwidth part to be activated by applying the changed configuration according to the configuration switching indicator starting from a specific time point, and may perform monitoring on the PDCCH in the control region configured in the activated bandwidth part.

In FIG. 8, the eNB transmits, to the UE, a configuration switching indicator 803 that indicates to change the activated bandwidth part from the existing bandwidth part #1 801 to the bandwidth part #2 802 in the slot #1 807. After receiving the corresponding indicator, the UE may activate the bandwidth part #2 802 according to the content of the indicator. In this case, a transition time 804 for the change of the bandwidth part may be required, and thus, a time point when the bandwidth part to be activated is changed and applied may be determined. FIG. 8 illustrates a case where the transition time 804 of one slot is required after receiving the configuration switching indicator 803. Data transmission and reception may not be performed at the transition time in 817. Accordingly, the bandwidth part #2 802 is activated in the slot #2 808 so that an operation of transmitting and receiving a control channel and data to and from the corresponding bandwidth part may be performed.

The eNB may configure in advance one or a plurality of bandwidth parts to the UE through higher layer signaling (e.g., RRC signaling), and may instruct the activation in such a manner that the configuration switching indicator 803 is mapped with one of the bandwidth part configurations configured in advance by the eNB. For example, an indicator of $\log_2 N$ bits may select and indicate one of N bandwidth parts configured in advance. Table 13 below shows an example of indicating configuration information for the bandwidth part using a 2-bit indicator.

TABLE 13

| Indicator value | Bandwidth part configuration |
|---|---|
| 00 | Bandwidth configuration A configured through higher layer signaling |
| 01 | Bandwidth configuration B configured through higher layer signaling |
| 10 | Bandwidth configuration C configured through higher layer signaling |
| 11 | Bandwidth configuration D configured through higher layer signaling |

The configuration switching indicator 703 for the bandwidth part described above may be transmitted from the eNB to the UE in the form of MAC CE signaling or L1 signaling (e.g., common DCI, group-common DCI, or UE-specific DCI).

A time point when the bandwidth part activation is applied according to the configuration switching indicator 803 for the above-described bandwidth part is as follows. The time point when the configuration switching is applied may depend on a predefined value (e.g., after the configuration switching indicator is received, the configuration switching is applied starting from one behind an N(≥1) slot). Alternatively, the eNB may configure the above-described time point to the UE through higher layer signaling (e.g., RRC signaling). Alternatively, the time point may be partially included in the content of the configuration switching indicator 803 and transmitted. Alternatively, the time point may be determined in a combination of the above-mentioned methods. The UE may receive the configuration switching indicator 803 for the bandwidth part and may then apply the changed configuration starting from the time point obtained by the above methods.

A time during which the PDCCH configuration switching according to the configuration switching indicator 803 for the above-described bandwidth part is applied is as follows. An interval (or time) during which the configuration switching is applied depends on a predefined value (e.g., the configuration switching is applied during N(≥1) slot). Alternatively, the eNB may configure the above-described interval (or time) to the UE through higher layer signaling (e.g., RRC signaling). Alternatively, the interval (or time) may be included in the content of the configuration switching indicator 803 and transmitted. Alternatively, the interval (or time) may be determined whether a specific condition is satisfied (e.g., if the next configuration switching indicator 803 is received, the interval (or time) is applied until one before the next configuration switching indicator or until the next configuration indicator is applied). Alternatively, the interval (or time) may be determined in a combination of the above-described methods. The UE may receive the configuration switching indicator 803 for the bandwidth part and may then apply the changed configuration during the time obtained by the above methods.

The following configurations 1, 2, and 3 described in Embodiment 1-1, Embodiment 1-2, and Embodiment 1-3 may be collectively referred to as PDCCH configuration.

Configuration 1: Monitoring period configuration for PDCCH (corresponding to Embodiment 1-1 of the disclosure), Configuration 2: Search space configuration for PDCCH (configuration for the number of PDCCH candidate groups in the same manner) (corresponding to Embodiment 1-2 of the disclosure), Configuration 3: Bandwidth (part) for monitoring PDCCH or configuration for bandwidth part of UE in the same manner (corresponding to Embodiment 1-3 of the disclosure)

The PDCCH configuration may correspond to a combination of one or a plurality of the above configurations (e.g., "configuration for PDCCH" may be composed of one of {configuration 1}, {configuration 2}, {configuration 3}, {configuration 1, configuration 2}, {configuration 2, configuration 3}, {configuration 1, configuration 3}, {configuration 1, configuration 2, configuration 3}).

As an example, if the PDCCH configuration is defined as {configuration 1, configuration 2} (that is, a combination of the monitoring period configuration and the search space configuration for the PDCCH), one or more PDCCH configurations may be transmitted from the eNB to the UE through higher layer signaling (RRC signaling). The base station may transmit a configuration switching indicator for PDCCH configuration to the UE, and the UE may change and apply the PDCCH configuration to conform a specific monitoring period and search space configuration according to the received configuration switching indicator.

The configuration switching indicator may be an indicator of, for example, $\log_2 N$ bits, and may select and indicate one of N PDCCH configurations configured in advance. Table 14 below shows an example of indicating PDCCH configuration information using a 2-bit indicator.

TABLE 14

| Indicator value | PDCCH configuration |
|---|---|
| 00 | PDCCH configuration A configured through higher layer signaling |
| 01 | PDCCH configuration B configured through higher layer signaling |
| 10 | PDCCH configuration C configured through higher layer signaling |
| 11 | PDCCH configuration D configured through higher layer signaling |

The configuration switching indicator described above may be transmitted from the eNB to the UE in the form of MAC CE signaling or L1 signaling (e.g., common DCI, group-common DCI, or UE-specific DCI).

A time point when the PDCCH configuration switching according to the configuration switching indicator is applied is as follows. The time point when the configuration switching is applied may depend on a predefined value (e.g., the configuration switching is applied starting from one behind N(≥1) slot). Alternatively, the eNB may configure the above-described time point to the UE through higher layer signaling (e.g., RRC signaling). Alternatively, the time point may be partially included in the content of the configuration switching indicator and transmitted. Alternatively, the time point may be determined in a combination of the above-mentioned methods. The UE may receive the configuration switching indicator and may then apply the changed configuration starting from the time point obtained by the above methods.

A time during which the PDCCH configuration switching according to the configuration switching indicator is applied is as follows. An interval (or time) during which the configuration switching is applied depends on a predefined value (e.g., the configuration switching is applied during N(≥1) slot). Alternatively, the eNB may configure the above-described interval (or time) to the UE through higher layer signaling (e.g., RRC signaling). Alternatively, the interval (or time) may be included in the content of the configuration switching indicator and transmitted. Alternatively, the interval (or time) may be determined whether a specific condition is satisfied (e.g., if the next configuration switching indicator is received, the interval (or time) is applied until one before the next configuration switching indicator or until the next configuration indicator is applied). Alternatively, the interval (or time) may be determined in a combination of the above-described methods. The UE may receive the configuration switching indicator and may then apply the changed configuration during the time obtained by the above methods.

Figure 9A:
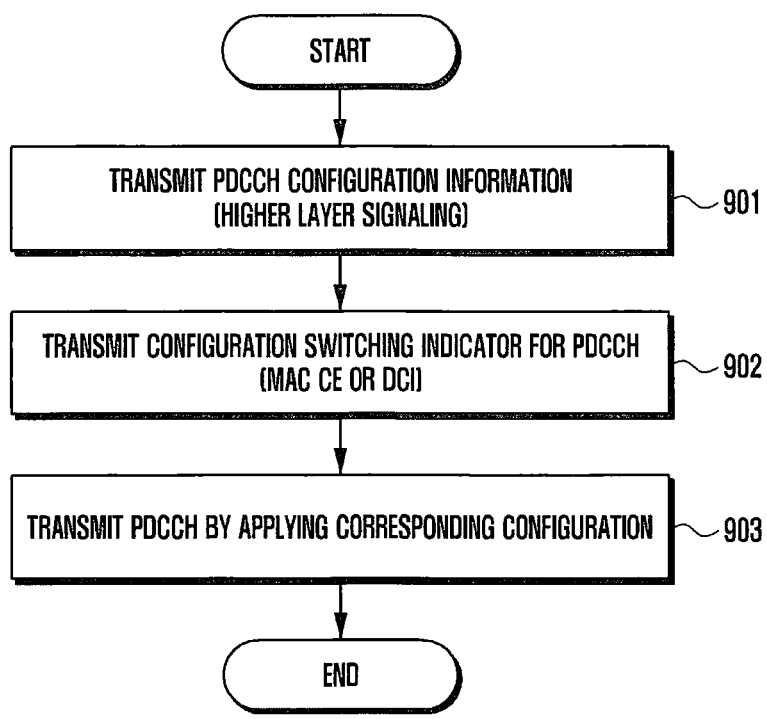
FIG. 9A is a diagram illustrating the operation of an eNB according to a first embodiment of the disclosure.

FIG. 9A is a diagram illustrating the operation of an eNB according to a first embodiment of the disclosure.

In operation 901, an eNB may transmit, to a UE, PDCCH configuration information (configuration consisting of one or more combinations of a monitoring period for the PDCCH, a search space configuration for the PDCCH, and a bandwidth part configuration) through higher layer signaling (RRC signaling). In operation 902, the eNB may transmit, to the UE, a configuration switching indicator for changing the PDCCH configuration through MAC CE or L1 signaling (common DCI, group-common DCI, or UE-specific DCI). The configuration switching indicator may always be transmitted at a predefined time or may be transmitted under the configuration of the eNB. In operation 903, the eNB may transmit the PDCCH by applying the corresponding configuration.

Figure 9B:
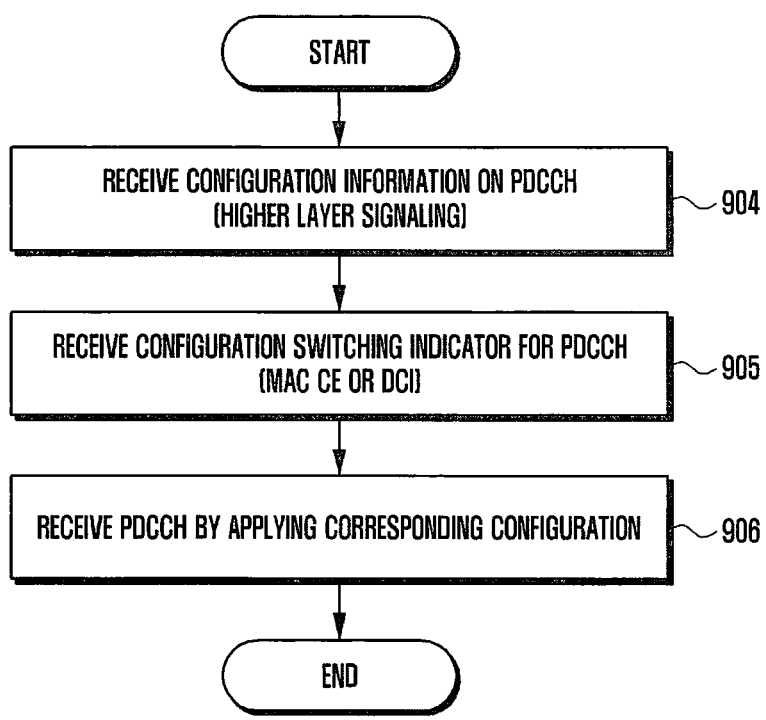
FIG. 9B is a diagram illustrating the operation of a UE according to a first embodiment of the disclosure.

FIG. 9B is a diagram illustrating the operation of a UE according to a first embodiment of the disclosure.

In operation 904, a UE may receive, from an eNB, PDCCH configuration information (configuration consisting of one or more combinations of a monitoring period for the PDCCH, a search space configuration for the PDCCH, and a bandwidth part configuration) through higher layer signaling (RRC signaling). In operation 905, the UE may receive a configuration switching indicator for changing the PDCCH configuration through MAC CE or L1 signaling (common DCI, group-common DCI, or UE-specific DCI). The configuration switching indicator may always be transmitted at a predefined time or may be transmitted under the configuration of the eNB. In operation 906, the UE may receive the PDCCH by changing and applying the configuration for the PDCCH according to the content of the received configuration switching indicator.

A method of transmitting the configuration switching indicator will be described in a second embodiment of the disclosure.

Second Embodiment

The second embodiment of the disclosure proposes specific embodiments of a method of transmitting a configuration switching indicator in carrying out the first embodiment of the disclosure.

Embodiment 2-1

The configuration switching indicator may be transmitted from the eNB to the UE through MAC CE signaling. When receiving the configuration switching indicator through the MAC CE signaling, the UE may change and apply PDCCH configuration according to the content of the configuration switching indicator.

Embodiment 2-2

The configuration switching indicator may be transmitted from the eNB to the UE using a common DCI. The common DCI may also be understood as a cell-specific DCI.

For example, a common DCI for different uses from the common DCI used as the configuration switching indicator may be added with CRC bits scrambled by different radio network temporary identifiers (RNTIs) and may be transmitted. The CRC is added to a DCI message payload to identify an error after decoding, and the CRC may be scrambled by a specific RNTI according to the use of the corresponding DCI (this is called a PDCCH (or DCI) configured by a specific RNTI). For example, scheduling information on a PDSCH through which a system information block (SIB) is transmitted may be obtained from a PDCCH configured as a system information RNTI (SI-RNTI), and scheduling information on the PDSCH through which a paging message is transmitted may be obtained from the PDCCH configured by a paging RNTI (P-RNTI). When performing blind decoding on a specific DCI format, the UE may determine whether an error occurs by using the CRC with respect to the decoded DCI message. In this case, by applying de-scrambling by different RNTIs, it is possible to know information corresponding to the DCI (that is, RNTI corresponding thereto or DCI for the UE).

The eNB transmits a cell-common X-RNTI (for example, PDCCH configuration-RNTI (PC-RNTI)) to the UE through higher layer signaling (for example, RRC signaling) for the purpose of distinguishing the DCI through which the configuration switching indicator is transmitted, and may configure to monitor the PDCCH configured by X-RNTI. The UE may additionally monitor the PDCCH configured by the received X-RNTI and may obtain a configuration switching indicator from the common DCI received therefrom.

As another example, the common DCI used as the configuration switching indicator may be transmitted using a DCI format having a different size from the common DCI having a different use. The RNTI used at this time may be the same as or different from the RNTI of the common DCI having a different use. The eNB may transmit the configuration switching indicator to the UE using the corresponding DCI format, and the UE may perform additional monitoring for the DCI format corresponding to the configuration switching indicator. Additionally, the eNB may configure whether to additionally monitor the DCI format for the configuration switching indicator to the UE through higher layer signaling (e.g., RRC signaling or system information (SI)).

Alternatively, the eNB may transmit the configuration switching indicator as a common DCI message in a method corresponding to a combination of the above methods.

In addition, the common DCI including the configuration switching indicator may be transmitted and received between the eNB and the UE on the common search space.

Embodiment 2-3

The configuration switching indicator may be transmitted from the eNB to the UE by a group common DCI.

For example, the group-common DCI used as the configuration switching indicator may be distinguished from the group-common DCI having a different use by different RNTIs and may be transmitted. The eNB may transmit a common X-RNTI (e.g., PC-RNTI) to a specific UE group (a UE belonging to the corresponding group) through higher layer signaling (e.g., RRC signaling) for the purpose of distinguishing a group-common DCI through which the configuration switching indicator is transmitted, and may configure to monitor the PDCCH configured by X-RNTI. The UE may additionally monitor the PDCCH configured by the received X-RNTI and may obtain a configuration switching indicator from the group-common DCI received therefrom.

As another example, the group-common DCI used as the configuration switching indicator may be transmitted using a DCI format having a different size from that of the group-common DCI having a different use. The RNTI used at this time may be the same as or different from the RNTI of the common DCI having a different use. The eNB may transmit the configuration switching indicator to the UE using a specific DCI format, and the UE may perform additional monitoring for the DCI format corresponding to the configuration switching indicator. In this case, the eNB may configure whether to additionally monitor the DCI format for the configuration switching indicator to the UE through higher layer signaling (e.g., RRC signaling).

As another example, a field corresponding to the configuration switching indicator may be additionally introduced into the group-common DCI. The eNB may transmit, to the UE, various types of control information (e.g., slot format indication, reserved resource information, pre-emption information, etc.) through the group-common DCI. In addition, the field corresponding to the configuration switching indicator may be added. The configuration switching indicator field may always be present in the group-common DCI or may be added by the configuration of the eNB. The UE may perform monitoring on the group-common DCI and may obtain corresponding configuration switching information from the existing (or configured) configuration switching indicator field.

Alternatively, the configuration switching indicator may be transmitted as a group-common DCI message in a method corresponding to a combination of the above methods.

The group-common DCI corresponding to the configuration switching indicator may be transmitted and received between the eNB and the UE on a common search space, a group-common search space, or a UE-specific search space.

Embodiment 2-4

The configuration switching indicator may be transmitted from the eNB to the UE by a UE-specific DCI.

For example, the UE-specific DCI used as the configuration switching indicator may be distinguished from the UE-specific DCI having a different use by different RNTIs and may be transmitted. The eNB may transmit an X-RNTI (e.g., PC-RNTI) to a specific UE through higher layer signaling (e.g., RRC signaling) for the purpose of distinguishing the UE-specific DCI through which the configuration switching indicator is transmitted, and may configure to monitor the PDCCH configured by X-RNTI. The UE may additionally monitor the PDCCH configured by the received X-RNTI and may obtain a configuration switching indicator from the UE-specific DCI received therefrom.

As another example, the UE-specific DCI used as the configuration switching indicator may be transmitted using a DCI format having a different size from the UE-specific DCI having a different use. The eNB may transmit the configuration switching indicator to the UE using a specific DCI format, and the UE may perform additional monitoring for the DCI format corresponding to the configuration switching indicator. In this case, the eNB may configure whether to additionally monitor the DCI format for the configuration switching indicator to the UE through higher layer signaling (e.g., RRC signaling).

As another example, a field corresponding to the configuration switching indicator may be additionally introduced into the UE-specific DCI.

In this case, a configuration switching indicator field may be added only to a specific UE-specific DCI format. For example, the configuration switching indicator field may be introduced only in the UE-specific DCI format (for example, DCI format 1A) used for the purpose of fallback. When desiring to dynamically change the PDCCH configuration of a specific UE, the eNB may transmit the corresponding indication information to the UE in a specific DCI format to which the configuration switching indicator field is added, and the UE may obtain a PDCCH configuration switching indicator from a specific DCI format to which the configuration switching indicator field is added. The configuration switching indicator field may always be present in the corresponding UE-specific DCI format or may be added by the configuration of the eNB. If the configuration switching indicator field is added by the configuration of the eNB, the UE may receive the configuration switching indicator from the corresponding UE-specific DCI only when the configuration for this is received from the eNB, and may apply dynamic configuration switching to the PDCCH configuration.

Alternatively, the configuration switching indicator field may be added to all of the UE-specific DCI formats of the corresponding UE. The configuration switching indicator field may be added to the UE-specific DCI format used for downlink scheduling assignment and the UE-specific DCI format used for uplink scheduling grant, respectively. In this case, when the UE acquires the configuration switching indicator, the following two methods may be considered as a method of applying the corresponding PDCCH configuration switching.

As a first method, when the configuration switching indicator is obtained, corresponding PDCCH configuration switching may be commonly applied to all DCI formats. For example, when the configuration switching indicator is obtained in a DCI format 1 corresponding to downlink scheduling allocation, the PDCCH configuration switching may be applied to monitor all DCI formats according to the content of the indicator.

As a second method, when the configuration switching indicator is obtained in a specific DCI format, the PDCCH configuration switching may be applied only to the DCI format. For example, it is assumed that the UE obtains the configuration switching indicator from the eNB in a DCI format 1 corresponding to downlink scheduling assignment, the configuration switching indicator instructs to apply the configuration switching to PDCCH configuration A, the UE obtains the configuration switching indicator in the DCI format 0 corresponding to uplink scheduling grant, and the configuration switching indicator instructs to apply the configuration switching to the PDCCH configuration B. In this case, the UE may perform monitoring by applying the PDCCH configuration A to the DCI format 1, and may perform monitoring by applying the PDCCH configuration B to the DCI format 0. In this manner, the eNB may transmit the same or different configuration switching indicator for each DCI format, so that PDCCH configuration may be applied in the same or different manner for each DCI format.

The configuration switching indicator field may always be present in the UE-specific DCI format or may be added by the configuration of the eNB. If the configuration switching indicator field is added by the configuration of the eNB, the UE may receive the configuration switching indicator from the UE-specific DCI only when the configuration for this is received from the eNB and may apply the dynamic configuration switching for the PDCCH configuration.

As another example, a configuration switching indicator value may be mapped to a combination of specific values of specific fields without adding a field for the configuration switching indicator to the UE-specific DCI format. For example, a method shown in Table 15 may be applied.

TABLE 15

| DCI format 0 | PDCCH configuration A | PDCCH configuration B | PDCCH configuration C |
|---|---|---|---|
| TPC command for scheduled PUSCH | set to "00" | N/A | N/A |
| Cyclic shift DM RS | set to "000" | N/A | N/A |
| Modulation and coding scheme and redundancy version | N/A | Set to "1111" | N/A |
| HARQ process number | N/A | FDD: set to "000" TDD: set to "0000" | N/A |
| Modulation and coding scheme | N/A | N/A | For the enabled transport block: MSB is set to "0" |
| Redundancy version | N/A | N/A | For the enabled transport block: set to "00" |

A combination of the specific field and the specific value may be pre-defined and may be promised between the eNB and the UE.

Alternatively, the configuration switching indicator may be transmitted as a UE-specific DCI message in a method corresponding to a combination of the above methods.

The UE-specific DCI corresponding to the configuration switching indicator may be transmitted and received between the eNB and the UE in the UE-specific search space.

Third Embodiment

The third embodiment of the disclosure proposes various methods for transmitting and receiving the configuration switching indicator for the PDCCH.

Embodiment 3-1

Figure 10A:
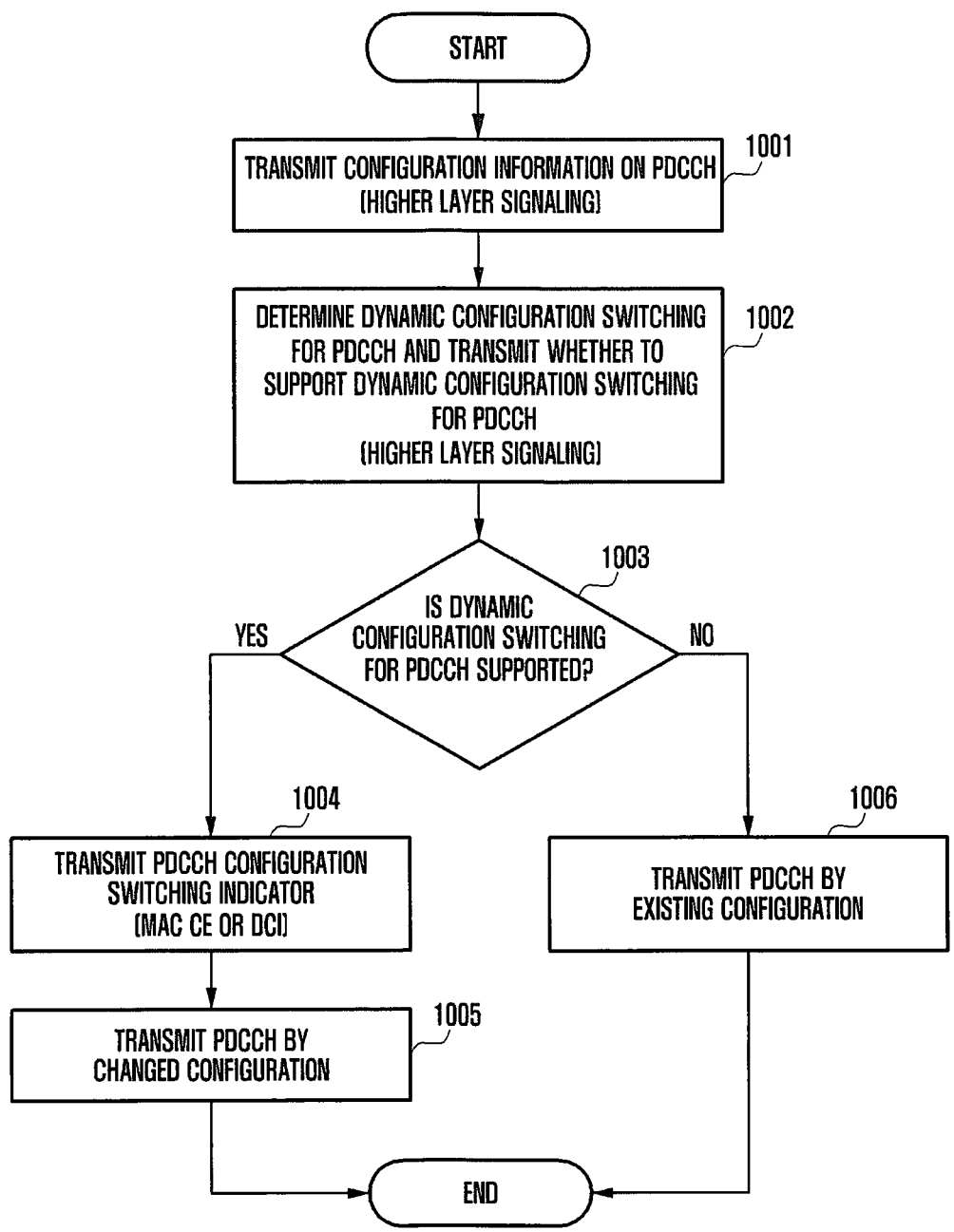
FIG. 10A is a diagram illustrating the operation of an eNB according to embodiment 3-1 of the disclosure.

FIG. 10A is a diagram illustrating the operation of an eNB according to Embodiment 3-1 of the disclosure.

In operation 1001, an eNB may transmit PDCCH configuration information to a UE through higher layer signaling (e.g., RRC signaling). Here, the PDCCH configuration may correspond to one or a combination of a plurality of pieces of configuration information of a monitoring period for the PDCCH, a search space configuration for the PDCCH, and a bandwidth (part) for monitoring the PDCCH as defined above. In operation 1002, the eNB may determine whether to dynamically switching the PDCCH configuration (i.e., determines whether to support PDCCH configuration dynamic switching), and may inform the UE of the support through higher layer signaling (e.g., RRC signaling). In operation 1003, whether the dynamic configuration switching for the PDCCH is supported is determined.

If the dynamic configuration switching for the PDCCH is supported, in operation 1004, the eNB may further transmit a PDCCH configuration switching indicator. The PDCCH configuration switching indicator may be variously transmitted by the method proposed in the second embodiment of the disclosure, and may indicate the PDCCH configuration switching as in the first embodiment of the disclosure. In operation 1005, the eNB may transmit the PDCCH by the corresponding PDCCH configuration according to the content of the PDCCH configuration switching indicator.

If the dynamic configuration switching for the PDCCH is not supported, in operation 1006, the eNB may transmit the PDCCH to the UE while maintaining the existing configuration configured in operation 1001.

Figure 10B:
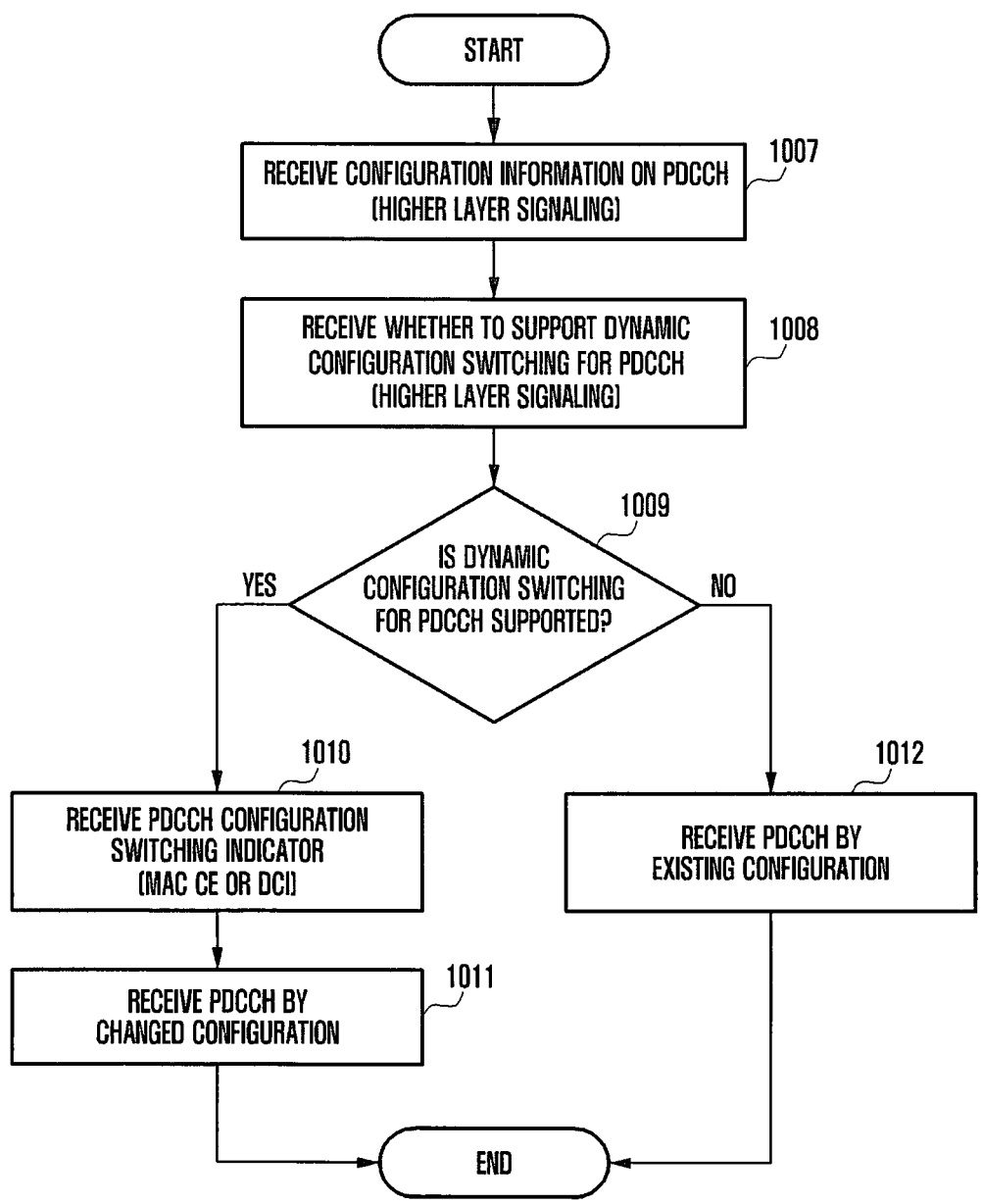
FIG. 10B is a diagram illustrating the operation of a UE according to embodiment 3-1 of the disclosure.

FIG. 10B is a diagram illustrating the operation of a UE according to Embodiment 3-1 of the disclosure.

In operation 1007, a UE may receive PDCCH configuration information from an eNB through higher layer signaling (e.g., RRC signaling). In operation 1008, the UE may receive information indicating whether to dynamically switching the PDCCH configuration (i.e., information indicating whether to support the PDCCH configuration dynamic switching) from the eNB through higher layer signaling (e.g., RRC signaling). In operation 1009, the UE may determine whether the dynamic configuration switching for the PDCCH is supported according to the configuration information received in operation 1008.

If it is determined in operation 1009 that the dynamic configuration switching for the PDCCH is supported, in operation 1010, the UE may further receive the PDCCH configuration switching indicator. The PDCCH configuration switching indicator may be received by various methods proposed in the second embodiment of the disclosure and may indicate the PDCCH configuration switching as in the first embodiment of the disclosure. In operation 1011, the UE may monitor the PDCCH according to the corresponding PDCCH configuration according to the content of the PDCCH configuration switching indicator.

If it is determined in operation 1009 that the dynamic configuration switching for the PDCCH is not supported, in operation 1012, the UE may monitor the PDCCH while maintaining the existing PDCCH configuration according to the configuration information received in operation 1007.

Embodiment 3-2

Figure 11A:
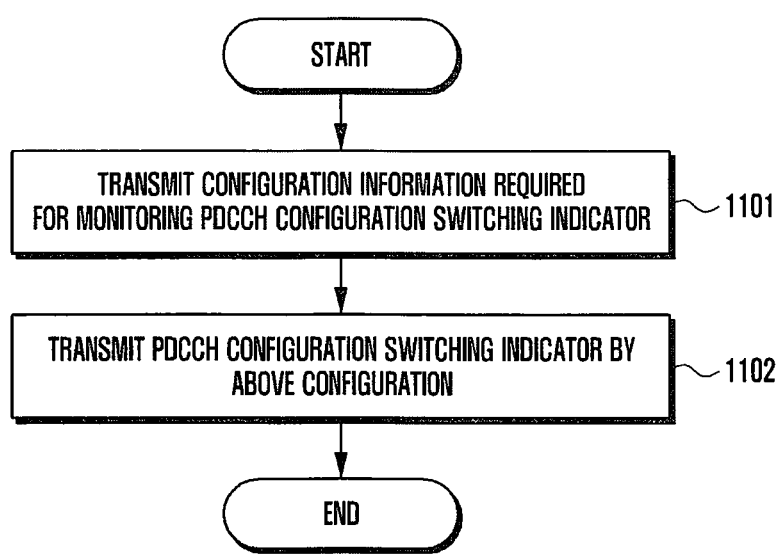
FIG. 11A is a diagram illustrating the operation of an eNB according to embodiment 3-2 of the disclosure.

FIG. 11A is a diagram illustrating the operation of an eNB according to Embodiment 3-2 of the disclosure.

In operation 1101, an eNB may transmit various types of configuration information necessary for monitoring a PDCCH configuration switching indicator to a UE through higher layer signaling (e.g., RRC signaling or system information (SI)). For example, the configuration information may include the following information, but is not limited thereto.

Configuration 1: PDCCH configuration switching indicator transmission period

Configuration 2: Slot (or symbol) index where PDCCH configuration switching indicator is transmitted Configuration information 3: Control region where PDCCH configuration switching indicator is transmitted Configuration information 4: Bandwidth part where PDCCH configuration switching indicator is transmitted In operation 1102, the eNB may transmit the PDCCH configuration switching indicator according to the configuration information informed to the UE.

Figure 11B:
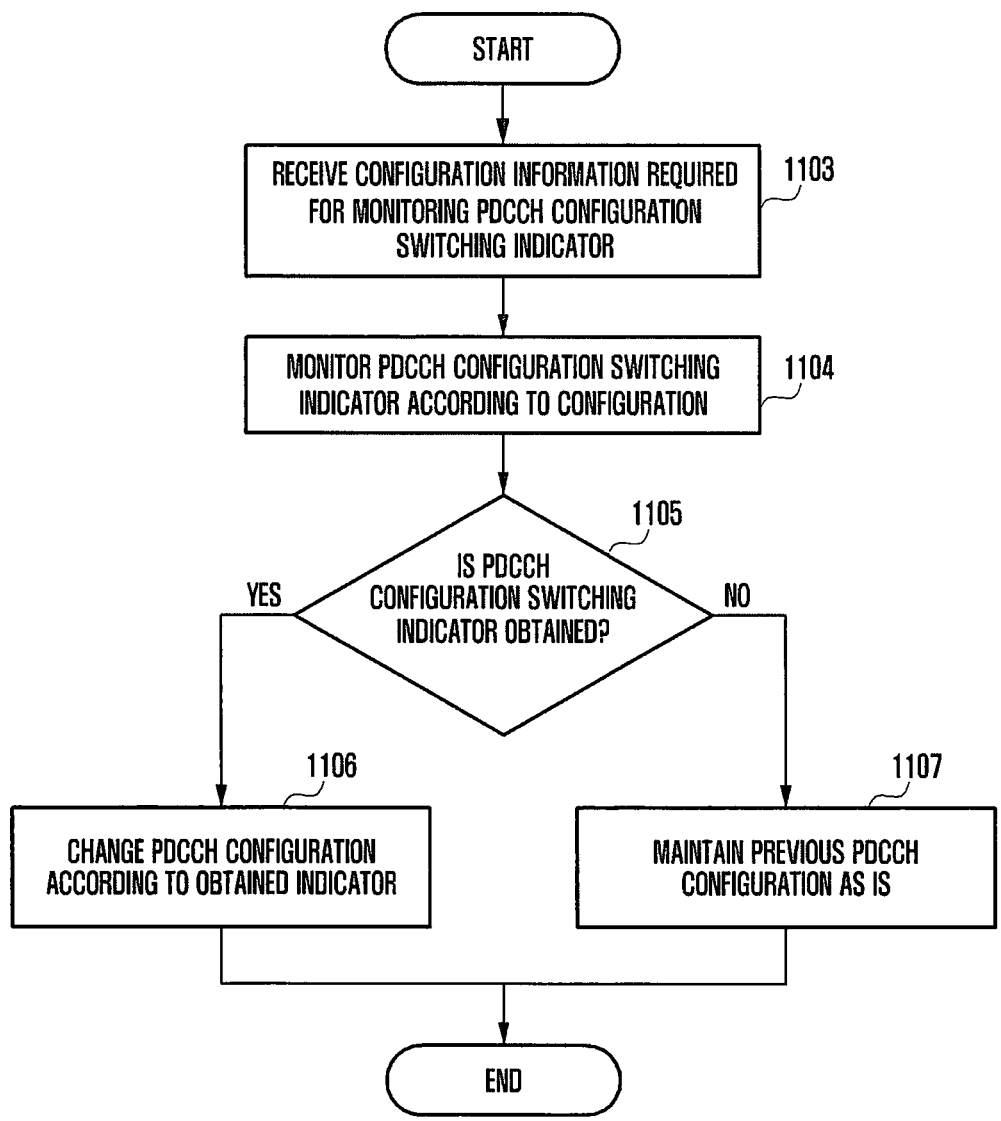
FIG. 11B is a diagram illustrating the operation of a UE according to embodiment 3-2 of the disclosure.

FIG. 11B is a diagram illustrating the operation of a UE according to Embodiment 3-2 of the disclosure.

In operation 1103, a UE may receive various types of configuration information necessary for monitoring a PDCCH configuration switching indicator from an eNB through higher layer signaling (e.g., RRC signaling or system information). In operation 1104, the UE may monitor the PDCCH configuration switching indicator according to the configuration information received in operation 1103. In operation 1105, the UE determines whether the PDCCH configuration switching indicator is obtained.

If the UE obtains the PDCCH configuration switching indicator in operation 1105, the UE may perform monitoring on the PDCCH by changing and applying the PDCCH configuration according to the obtained configuration switching indicator in operation 1106. If the UE does not obtain the PDCCH configuration switching indicator in operation 1105, the UE may monitor the PDCCH while maintaining the existing PDCCH configuration in operation 1107.

Fourth Embodiment

In case of applying the dynamic configuration switching for the PDCCH proposed in the disclosure, if a UE fails to successfully decode a corresponding DCI when a configuration switching indicator is transmitted to the DCI, an eNB and the UE may apply different PDCCH configurations. That is, when the UE fails to decode the DCI although the eNB transmits a configuration switching indicator for changing from PDCCH configuration A to configuration B through the DCI, the eNB may apply the PDCCH configuration B and the UE may apply the PDCCH configuration A. In this case, PDCCH transmission and reception between the eNB and the UE may not be performed properly, and thus data transmission and reception itself may not be possible. For example, when the PDCCH configuration A corresponds to a 2-slot PDCCH monitoring period (relatively long period), and the PDCCH configuration B corresponds to a 1-slot PDCCH monitoring period (relatively short period), the UE may fail to receive some of the PDCCHs transmitted by the eNB every slot. Alternatively, in a case where the PDCCH configuration A corresponds to a partial search space and the PDCCH configuration B corresponds to the entire search space, when the eNB transmits the PDCCH in the remaining search space except for the partial search space corresponding to the PDCCH configuration A among the entire search spaces, the UE may fail to receive the PDCCH. Alternatively, in a case where the PDCCH configuration A corresponds to a bandwidth part #1, the PDCCH configuration B corresponds to a bandwidth part #2, and the bandwidth part #1 and the bandwidth part #2 have different configuration information (bandwidth size, frequency position, numerology, etc.), the UE may fail to receive the PDCCH transmitted by the eNB in the bandwidth part #2. The fourth embodiment of the disclosure proposes some embodiments for solving the above problem.

Embodiment 4-1

In Embodiment 4-1 of the disclosure, when a UE successfully receives the PDCCH configuration switching indicator, the UE may transmit acknowledgment information (ACK) to an eNB to prevent a case where different PDCCH configurations are applied between the eNB and the UE. After the eNB receives the ACK for the PDCCH configuration switching indicator from the UE, the eNB may transmit the PDCCH by applying the changed PDCCH configuration after a predetermined time, and the UE applies the changed PDCCH configuration after a predetermined time after transmitting the ACK and monitors PDCCH.

Figure 12A:
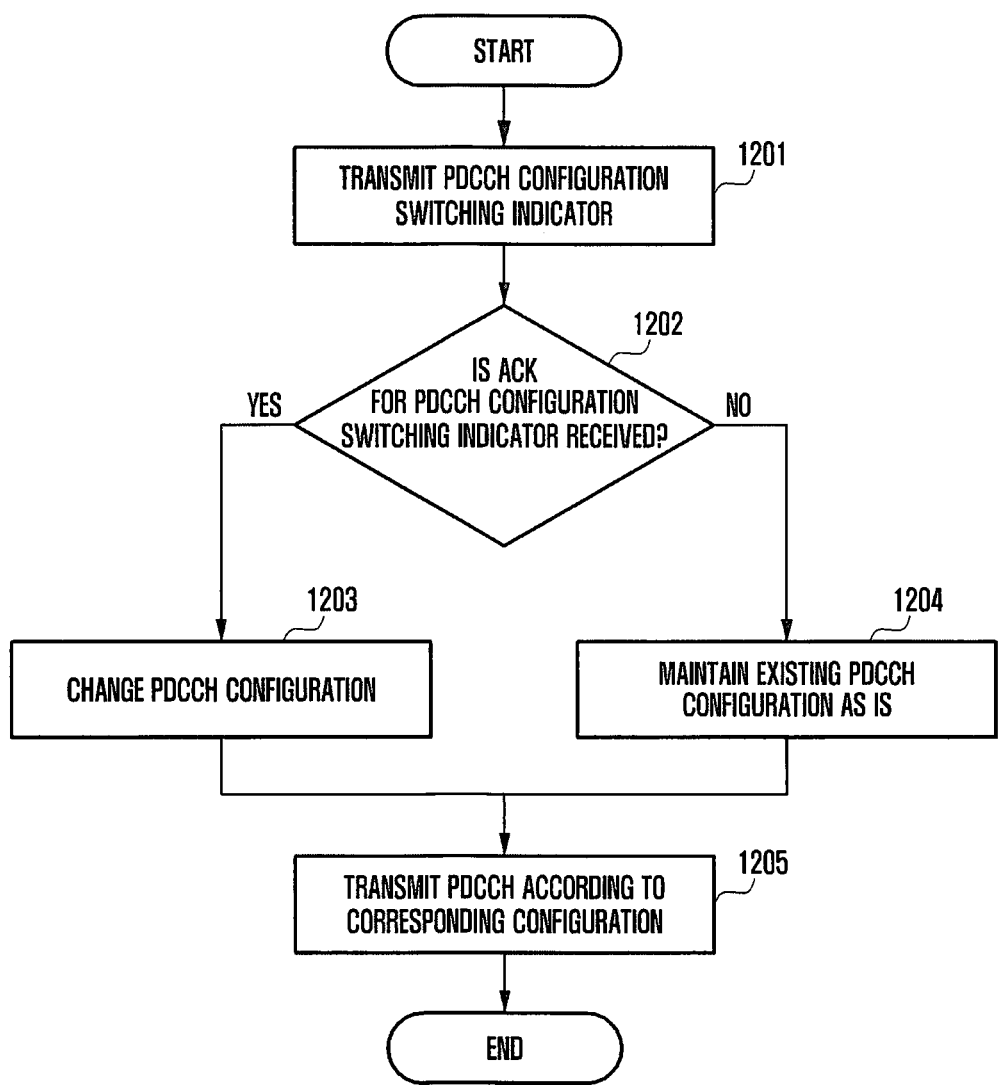
FIG. 12A is a diagram illustrating the operation of an eNB according to embodiment 4-1 of the disclosure.

FIG. 12A is a diagram illustrating the operation of an eNB according to Embodiment 4-1 of the disclosure.

In operation 1201, an eNB may transmit a PDCCH configuration switching indicator to a UE. In operation

1202, the eNB may determine whether ACK for the PDCCH configuration switching indicator is received from the UE.

If the eNB receives the ACK for the PDCCH configuration switching indicator in operation 1202, the eNB may change the PDCCH configuration in operation 1203 and transmit the PDCCH according to the changed PDCCH configuration in operation 1205. If the ACK for the PDCCH configuration switching indicator is not received in operation 1202, the eNB may maintain the PDCCH configuration as is at operation 1204 and may transmit the PDCCH according to the existing PDCCH configuration in operation 1205. The eNB may retransmit the PDCCH configuration switching indicator as needed.

Figure 12B:
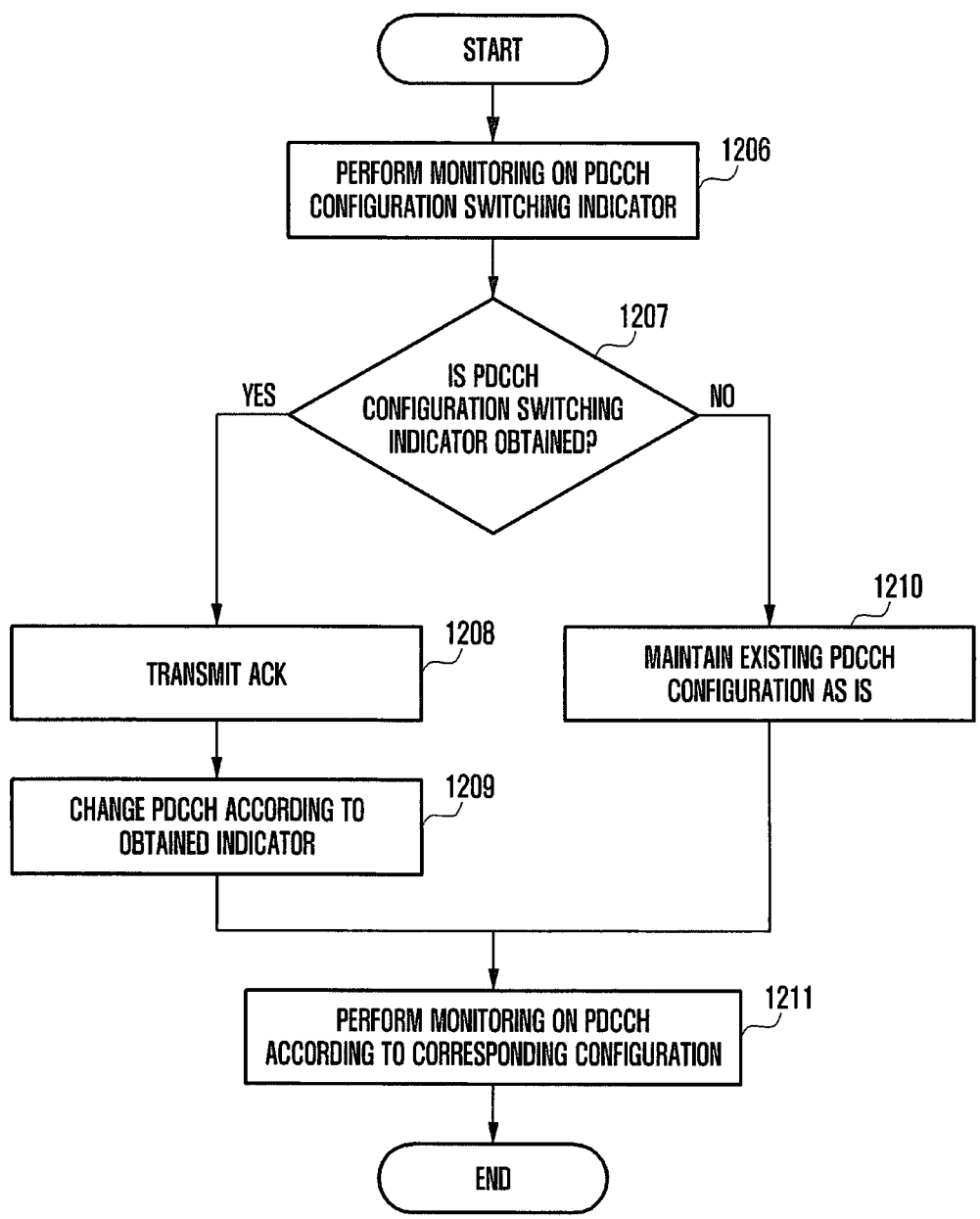
FIG. 12B is a diagram illustrating the operation of a UE according to embodiment 4-1 of the disclosure.

FIG. 12B is a diagram illustrating the operation of a UE according to Embodiment 4-1 of the disclosure.

In operation 1206, a UE may monitor a PDCCH configuration switching indicator. In operation 1207, the UE may determine whether the PDCCH configuration switching indicator has been successfully obtained.

If it is determined in operation 1207 that the PDCCH configuration switching indicator has been successfully obtained, the UE may transmit an ACK to an eNB in operation 1208. The ACK information may be transmitted from the UE to the eNB on a physical uplink control channel (PUCCH) or a physical uplink shared channel (PUSCH) through L1 signaling, for example, in the form of a UCI. Alternatively, the ACK information may be transmitted to the eNB through MAC CE signaling. The UE may change the PDCCH configuration according to the content of the PDCCH configuration switching indicator obtained in operation 1209 and may monitor the PDCCH according to the corresponding configuration in operation 1211.

If it is determined in operation 1207 that the PDCCH configuration switching indicator has not been successfully obtained, the UE may maintain the existing PDCCH configuration in operation 1210 and may monitor the PDCCH according to the existing PDCCH configuration in operation 1211.

Embodiment 4-2

In Embodiment 4-2 of the disclosure, after the UE successfully receives the PDCCH configuration switching indicator, when the PDCCH configuration changed according to the configuration switching indicator satisfies a specific condition, an operation of returning to the PDCCH configuration before the change after a specific time (T) is provided.

Figure 13A:
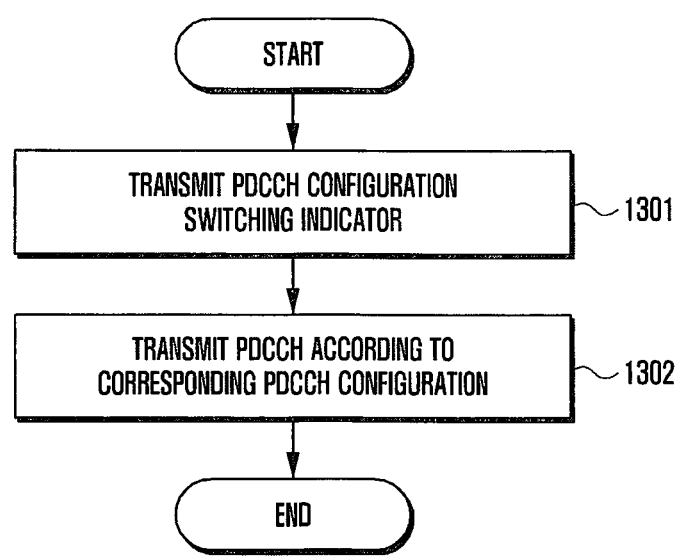
FIG. 13A illustrates the operation of an eNB according to embodiment 4-2 of the disclosure.

FIG. 13A is a diagram illustrating the operation of an ENB according to Embodiment 4-2 of the disclosure.

An eNB may transmit a PDCCH configuration switching indicator in operation 1301, and may transmit a PDCCH according to the corresponding PDCCH configuration in operation 1302.

Figure 13B:
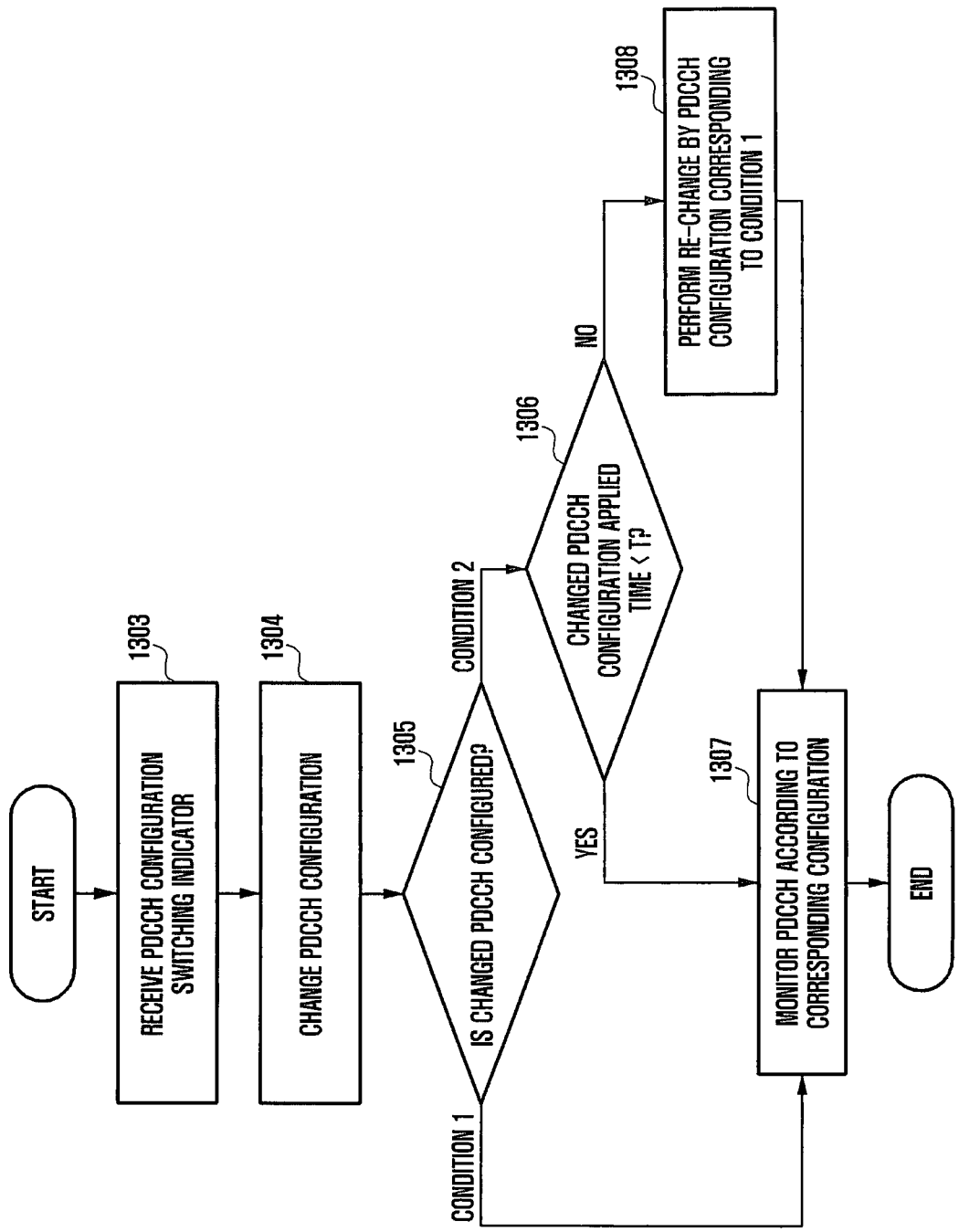
FIG. 13B is a diagram illustrating the operation of a UE according to embodiment 4-2 of the disclosure.

FIG. 13B is a diagram illustrating an operation of a terminal according to Embodiment 4-2 of the disclosure.

In operation 1303, a UE may receive a PDCCH configuration switching indicator. In operation 1304, the UE performs PDCCH configuration switching according to the configuration switching indicator. In operation 1305, the UE may determine whether the changed PDCCH configuration satisfies Condition 1 or Condition 2.

If the UE determines that the changed PDCCH configuration satisfies Condition 1 in operation 1305, the UE may monitor the PDCCH according to the changed PDCCH configuration in operation 1307.

If the UE determines that the changed PDCCH configuration satisfies Condition 2 in operation 1305, the UE further determines whether a time when the changed PDCCH configuration is applied exceeds a predefined specific time T in operation 1306. If the time when the changed PDCCH configuration is applied in operation 1306 is less than or equal to T, the UE may continue to monitor the PDCCH according to the corresponding changed PDCCH configuration in operation 1307. If the time when the changed PDCCH configuration is applied in operation 1306 is greater than T, re-change to the PDCCH configuration corresponding to Condition 1 in operation 1308 may be performed, and monitoring for the PDCCH may be performed according to the PDCCH configuration corresponding to Condition 1 in operation 1307.

Condition 1 determined in operation 1305 may correspond to PDCCH configuration A and Condition 2 may correspond to PDCCH configuration B. Table 14 may be considered as an example of the PDCCH configuration A and the PDCCH configuration B. One or more of a PDCCH monitoring period, a PDCCH search space configuration, and a PDCCH monitoring bandwidth condition of Table 16 may be applied.

TABLE 16

| PDCCH configuration | PDCCH configuration A | PDCCH configuration B |
| --- | --- | --- |
| PDCCH monitoring period | 1 slot period | K slot periods (K > 1) |
| PDCCH search space configuration | Entire search space X | Partial search space Y (Y = α · X α < 1) |
| PDCCH monitoring bandwidth | UE entire bandwidth (B MHz) | Bandwidth part (C(<B) MHz) |

In consideration of the PDCCH configuration A and the PDCCH configuration B described in Table 16, if the UE monitors the PDCCH by the PDCCH configuration A, the PDCCH transmitted by the PDCCH configuration B may always be received. Therefore, if the UE monitors the PDCCH by the PDCCH configuration A, the UE may successfully receive the PDCCH thereafter even though the UE fails to properly receive the PDCCH configuration change indicator transmitted by the eNB (PDCCH configuration is changed to B).

On the other hand, if the UE monitors the PDCCH using the PDCCH configuration B, the UE may or may not receive the PDCCH transmitted through the PDCCH configuration A. Therefore, in a case where the UE monitors the PDCCH by the PDCCH configuration B, when the PDCCH configuration switching indicator (which changes the PDCCH configuration to A) transmitted by the eNB is not properly received, the PDCCH transmitted thereafter may not be properly received.

In this manner, in a case where the PDCCH configuration is changed to the PDCCH configuration B due to the PDCCH configuration switching indicator, when the additional PDCCH configuration switching indicator is missed while the PDCCH is monitored by the PDCCH configuration B, there is a possibility that the PDCCH is not properly received thereafter. Therefore, if T, which is a maximum time length for performing the PDDCH monitoring by the PDCCH configuration B, is predefined and then the PDCCH configuration is changed to the PDCCH configuration A after T, the PDCCH transmitted after T may be successfully received.

Depending on a method of determining a threshold value T, a trade-off between the power consumption reduction of the UE and the probability of successfully receiving the PDCCH may be adjusted. Compared to the PDCCH configuration B, according to the PDCCH configuration A, the UE monitors the PDCCH more frequently, searches for more PDCCH candidate groups, and performs monitoring with a wider bandwidth, thereby increasing power consumption of the UE. Since the longer the value of T, the longer the time to monitor the PDCCH according to the PDCCH configuration B, it is more advantageous to reduce the power consumption of the UE. However, if the PDCCH configuration switching indicator transmitted by the eNB is not properly received, the probability of successfully receiving the PDCCH may be lowered.

This embodiment is not limited to being applied to the above-described PDCCH configurations A and B, but may be applied to the PDCCH configuration having an inclusive relationship therebetween (for example, the PDCCH configuration A includes the PDCCH configuration B {on the PDCCH monitoring frequency or resources for monitoring the PDCCH}) in the same manner.

In addition, the PDCCH configuration of the UE may be changed, but such a configuration change is to reduce the power consumption of the UE, and the eNB may continuously transmit the PDCCH according to the initial PDCCH configuration.

Fifth Embodiment

Figure 14:
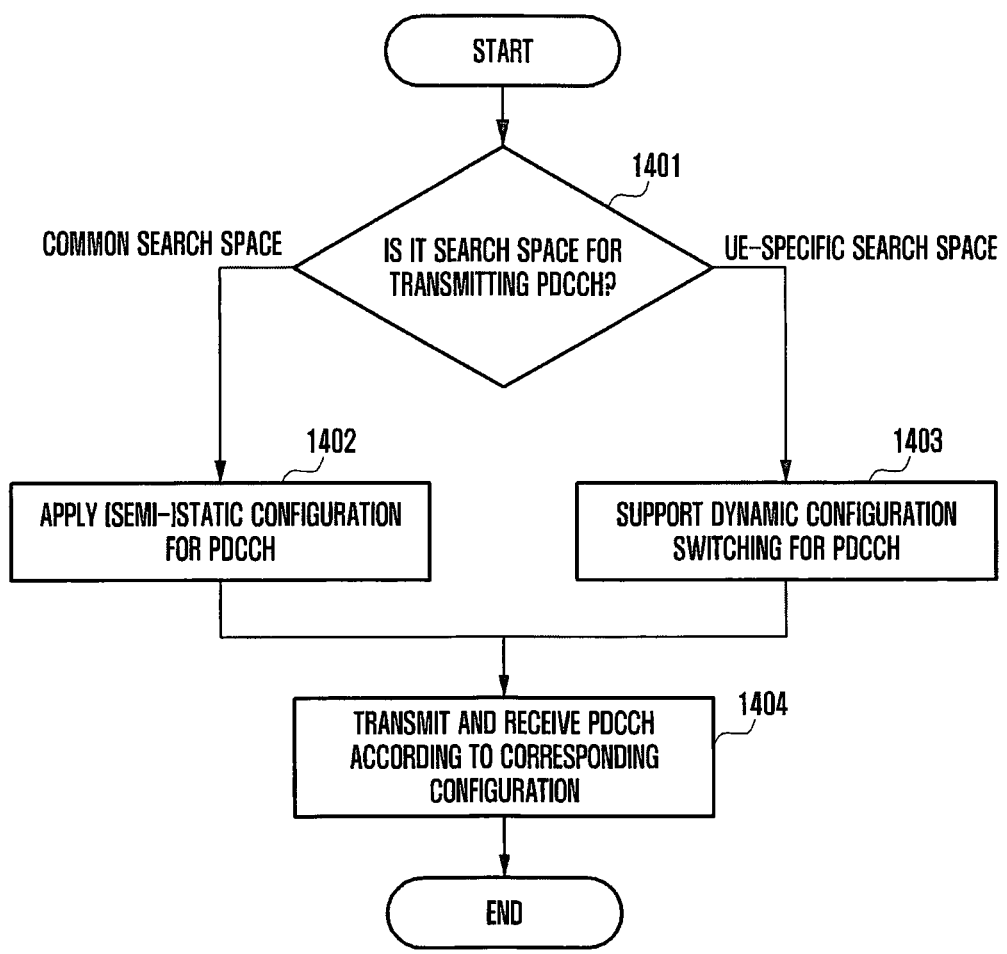
FIG. 14 is a diagram illustrating the operation of an eNB and a UE according to a fifth embodiment of the disclosure.

FIG. 14 is a diagram illustrating a PDCCH configuration method according to a fifth embodiment of the disclosure.

In the fifth embodiment of the disclosure, in applying the configuration for the PDCCH, a method of supporting semi-static or dynamic configuration according to the type of a search space to which the corresponding PDCCH is to be transmitted is proposed.

FIG. 14A is a diagram illustrating the operation of an eNB and a UE according to a fifth embodiment of the disclosure.

In operation 1401 of FIG. 14, an eNB and a UE may determine a search space to which the PDCCH is desired to be transmitted.

If it is determined in operation 1401 that the search space is a common search space (or group-common search space), only static or semi-static PDCCH configurations may be applied to the search space in operation 1402, and the eNB and the UE may transmit and receive the PDCCH according to the corresponding configuration in operation 1404. In this case, the eNB may inform the UE of the PDCCH configuration information through higher layer signaling, for example, master information block (MIB) or/and system information block (SIB), or RRC signaling, and the UE may perform monitoring on the corresponding PDCCH by the received PDCCH configuration information.

If it is determined in operation 1401 that the search space is a UE-specific search space (or group-common search space), in operation 1403, the dynamic configuration switching method for the PDCCH proposed by the disclosure may be applied to the search space. In operation 1404, the eNB and the UE may transmit and receive the PDCCH according to the corresponding configuration. In this case, the eNB may inform the UE of one or a plurality of pieces of PDCCH configuration information through higher layer signaling (RRC signaling), and may additionally transmit the PDCCH configuration switching indicator through MAC CE or DCI. The UE may receive one or a plurality of pieces of PDCCH configuration information from the eNB through higher layer signaling (RRC signaling) and may additionally receive the PDCCH configuration switching indicator through MAC CE or DCI. The eNB and the UE may determine the configuration for the PDCCH by a combination of RRC signaling and MAC CE or DCI signaling, and may transmit and receive the PDCCH in the corresponding configuration in operation 1404.

Sixth Embodiment

A sixth embodiment of the disclosure provides a method of determining a time and an interval to apply PDCCH configuration switching according to the PDCCH configuration switching indicator.

First, the configuration switching application time will be described. For example, when the configuration switching indicator is received in an n-th slot (or symbol), the PDCCH configuration switching may be applied starting from an (n+k)-th slot (or symbol). In this case, k may be determined in the following method.

A value of k may be a predefined value (e.g., a natural number of k=1) promised between the eNB and the UE. For example, k=1 may be satisfied.

The value of k may be configured through higher layer signaling (e.g., RRC or system information) from the eNB to the UE.

The value of k may be included in the content of the configuration switching indicator and may be transmitted from the eNB to the UE.

Next, the configuration switching application interval will be described. For example, when the configuration switching is applied according to the configuration switching indicator starting from an n-th slot (or symbol), the changed configuration may be maintained up to an (n+k)-th slot (or symbol). In this case, k may be determined in the following method.

The value of k may be a predefined value (e.g., a natural number of k=1) promised between the eNB and the UE. For example, k=1 may be satisfied.

The value of k may be configured through higher layer signaling (e.g., RRC or system information) from the eNB to the UE.

The value of k may be included in the content of the configuration switching indicator and may be transmitted from the eNB to the UE.

The value of k may be determined by a specific condition. Here, if the next configuration switching indicator is received, the specific condition may correspond to application until one before the next configuration switching indicator. Alternatively, if the next configuration switching indicator is received, the specific condition may correspond to application until the configuration switching indicator subsequent to the next configuration switching indicator is applied.

One or more of the various embodiments of the disclosure described above may be operated in combination with each other.

Figure 15:
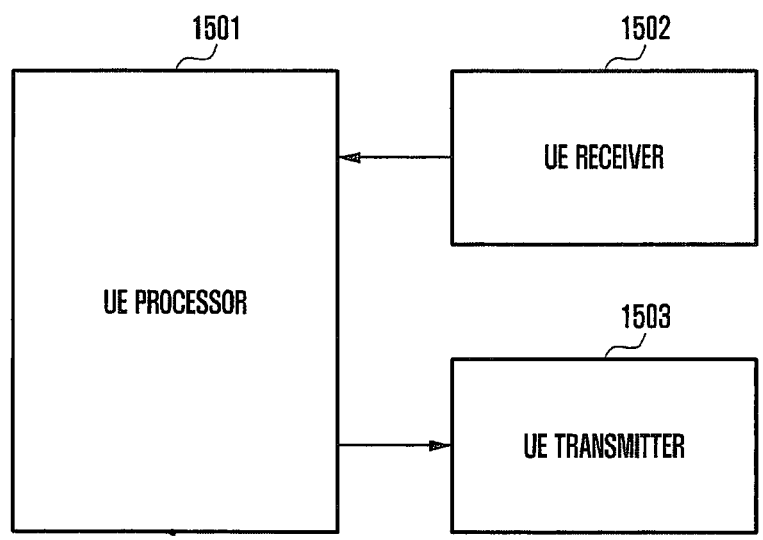
FIG. 15 is a block diagram illustrating an internal structure of a UE according to an embodiment of the disclosure.
Figure 16:
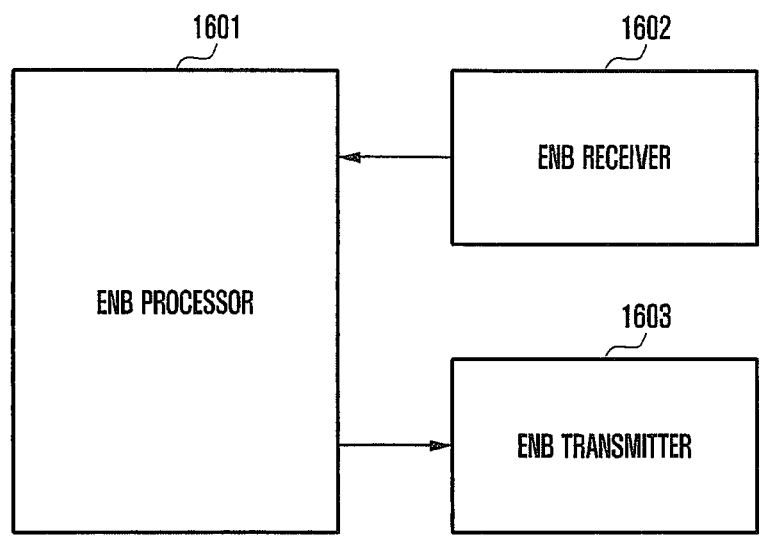
FIG. 16 is a block diagram illustrating an internal structure of an eNB according to an embodiment of the disclosure.

In order to carry out the above embodiments of the disclosure, a transmitter, a receiver, and a controller of each of a UE and an eNB are illustrated in FIGS. 15 and 16, respectively. In the 5G communication system corresponding to the above embodiments, a configuration method of a PDCCH, a configuration switching method of a PDCCH, a monitoring method of a PDCCH, and a structure of an eNB and a UE performing a DCI transmission method are shown. The transmitter, receiver, and processor of each of the eNB and the UE should operate according to the embodiment.

FIG. 15 is a block diagram illustrating an internal structure of a UE according to an embodiment of the disclosure.

As shown in FIG. 15, the UE of the disclosure may include a UE processor 1501, a UE receiver 1502, and a UE transmitter 1503.

The UE processor 1501 may control a series of processes so that the UE may operate according to the above-described embodiment of the disclosure. For example, the UE processor 1501 may control operations such as a PDCCH configuration method, a PDCCH configuration switching method, a PDCCH monitoring method, a DCI decoding method, feedback for the PDCCH configuration switching indicator, and the like according to the embodiment of the disclosure to be performed. The UE receiver 1502 and the UE transmitter 1503 may be collectively referred to as a transceiver in the embodiment of the disclosure. The transceiver may transmit and receive a signal to and from the eNB. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel, output the signal to the UE processor 1501, and transmit a signal output from the UE processor 1501 through a wireless channel.

Specifically, the UE processor 1501 may control the transceiver to receive information indicating whether the dynamic PDCCH configuration switching is performed, the PDCCH configuration information, and the PDCCH configuration switching indicator according to the embodiment of the disclosure, and may control the transceiver to monitor the PDCCH according to the above information.

FIG. 16 is a block diagram showing an internal structure of an eNB according to an embodiment of the disclosure. As shown in FIG. 16, the eNB of the disclosure may include an eNB processor 1601, an eNB receiver 1602, and an eNB transmitter 1603.

The eNB processor 1601 may control a series of processes to operate the eNB according to the above-described embodiment of the disclosure. For example, eNB processor 1601 may control operations such as the PDCCH configuration method, the PDCCH configuration switching indicator transmission method, the PDCCH configuration switching method, the DCI transmission method, and the like to be performed according to the embodiment of the disclosure. In addition, eNB processor 1601 may control various additional indicators and configuration information to be transmitted as necessary. The eNB receiver 1602 and the eNB transmitter 1603 may be collectively referred to as a transceiver in the embodiment of the disclosure. The transceiver may transmit and receive a signal to and from the UE. The signal may include control information and data. To this end, the transceiver may include an RF transmitter for up-converting and amplifying the frequency of the transmitted signal, and an RF receiver for low-noise amplifying and down-converting the received signal. Also, the transceiver may receive a signal through a wireless channel, output the signal to the eNB processor 1601, and transmit the signal output from the eNB processor 1601 through a wireless channel.

Specifically, the eNB processor 1601 may determine whether the dynamic PDCCH configuration switching is performed according to the embodiment of the disclosure, may control the transceiver to transmit information indicating whether the dynamic PDCCH configuration switching is performed, the PDCCH configuration information, and the PDCCH configuration switching indicator, and may control the transceiver to transmit the DCI on the PDCCH according to the above information.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

The invention claimed is:

1. A method of monitoring a control channel by a user equipment (UE) of a wireless communication system, the method comprising:

receiving physical downlink control channel (PDCCH) configuration information indicating a first configuration from a base station;

monitoring a PDCCH according to the first configuration on the basis of the PDCCH configuration information;

receiving a configuration switching indicator indicating a second configuration from the base station; and monitoring the PDCCH according to the second configuration on the basis of the configuration switching indicator, wherein the configuration switching indicator includes at least one of a control channel monitoring period, search space configuration information, and bandwidth configuration information to monitor the PDCCH, and the configuration switching indicator is received using one of a medium access control (MAC) control element (CE) or downlink control information.

2. The method as claimed in claim 1, wherein the second configuration is applied after a predetermined time or after a time configured by higher layer signaling after receiving the configuration switching indicator.

3. The method as claimed in claim 1, wherein the second configuration is applied during a specific time determined in advance, and the second configuration is a subset of the first configuration.

4. The method as claimed in claim 1, wherein the configuration switching indicator is applied to a UE-specific search space.

5. A method of transmitting control information by a base station in a wireless communication system, the method comprising:

transmitting PDCCH configuration information indicating a first configuration to a user equipment (UE);

transmitting downlink control information to the UE on the basis of the first configuration;

transmitting a configuration switching indicator indicating a second configuration to the UE; and transmitting the downlink control information to the UE according to the second configuration, wherein the configuration switching indicator includes at least one of a control channel monitoring period, search space configuration information, and bandwidth configuration information to which the downlink control information is transmitted, and the configuration switching indicator is transmitted using one of a MAC CE or downlink control information.

6. The method as claimed in claim 1, wherein the second configuration is applied after a predetermined time or after a time configured by higher layer signaling after receiving the configuration switching indicator.

7. The method as claimed in claim 1, wherein the second configuration is applied during a specific time determined in advance, and the second configuration is a subset of the first configuration.

8. The method as claimed in claim 1, wherein the configuration switching indicator is applied to a UE-specific search space.

9. A user equipment (UE) that monitors a control channel of a wireless communication system, the UE comprising:
- a transceiver; and
- a controller configured to be connected to the transceiver and configured to control the transceiver to receive PDCCH configuration information indicating a first configuration from a base station, to monitor a PDCCH according to the first configuration on the basis of the PDCCH configuration information, to receive a configuration switching indicator indicating a second configuration from the base station, and to monitor the PDCCH according to the second configuration on the basis of the configuration switching indicator, wherein
- the configuration switching indicator includes at least one of a control channel monitoring period, search space configuration information, and bandwidth configuration information to monitor the PDCCH, and
- the configuration switching indicator is received using one of a MAC CE or downlink control information.

10. The UE as claimed in claim 9, wherein the second configuration is applied after a predetermined time or after a time configured by higher layer signaling after receiving the configuration switching indicator.

11. The UE as claimed in claim 9, wherein the second configuration is applied during a specific time determined in advance, and the second configuration is a subset of the first configuration.

12. The UE as claimed in claim 9, wherein the configuration switching indicator is applied to a UE-specific search space.

13. An base station that transmits control information of a wireless communication system, the base station comprising:
- a transceiver; and
- a controller configured to be connected to the transceiver and configured to control the transceiver to transmit PDCCH configuration information indicating a first configuration to a user equipment (UE), to transmit downlink control information to the UE on the basis of the first configuration, to transmit a configuration switching indicator indicating a second configuration to the UE, and to transmit the downlink control information to the UE according to the second configuration, wherein
- the configuration switching indicator includes at least one of a control channel monitoring period, search space configuration information, and bandwidth configuration information to which the downlink control information is transmitted, and
- the configuration switching indicator is transmitted using one of a MAC CE or downlink control information.

14. The base station as claimed in claim 13, wherein second configuration is applied after a predetermined time or after a time configured by higher layer signaling after receiving the configuration switching indicator.

15. The base station as claimed in claim 13, wherein
- the second configuration is applied during a specific time determined in advance,
- the second configuration is a subset of the first configuration, and
- the configuration switching indicator is applied to a UE-specific search space.

* * * * *